US012764720B2

(12) United States Patent
Noh et al.

(10) Patent No.: US 12,764,720 B2
(45) Date of Patent: *Oct. 13, 2026

(54) TRIGGER-BASED RANDOM ACCESS FOR WIRELESS DEVICE

(71) Applicant: Atlas Global Technologies LLC, Austin, TX (US)

(72) Inventors: Yujin Noh, Austin, TX (US); Young Hoon Kwon, Austin, TX (US)

(73) Assignee: Atlas Global Technologies LLC, Austin, TX (US)

( * ) Notice: Subject to any disclaimer, the term of this patent is extended or adjusted under 35 U.S.C. 154(b) by 299 days.

This patent is subject to a terminal disclaimer.

(21) Appl. No.: 18/439,312

(22) Filed: Feb. 12, 2024

(65) Prior Publication Data

US 2024/0188140 A1 Jun. 6, 2024

Related U.S. Application Data

(63) Continuation of application No. 17/139,884, filed on Dec. 31, 2020, now Pat. No. 11,930,535, which is a (Continued)

(51) Int. Cl.

| | |
|---|---|
| ***H04W 74/0833*** | (2024.01) |
| ***H04W 72/04*** | (2023.01) |
| ***H04W 76/15*** | (2018.01) |

(52) U.S. Cl.
CPC ........... *H04W 72/04* (2013.01); *H04W 76/15* (2018.02)

(58) Field of Classification Search
CPC ... H04W 72/04; H04W 74/006; H04W 76/15; H04W 72/53; H04W 84/12
See application file for complete search history.

(56) References Cited

U.S. PATENT DOCUMENTS

| | | | |
|---|---|---|---|
| 11,716,171 B2 * | 8/2023 | Ahn | H04L 1/1671 370/329 |
| 2017/0171878 A1 * | 6/2017 | Chun | H04B 7/0452 |

(Continued)

OTHER PUBLICATIONS

"Part 11: Wireless LAN Medium Access Control (MAC) and Physical Layer (PHY) Specifications, Amendment 2: Sub 1 GHz License Exempt Operation", IEEE P802.11ah/D5.0, Mar. 2015, pp. 1-604, IEEE (The Institute of Electrical and Electronic Engineers, Inc.), New York, NY, USA.

(Continued)

*Primary Examiner* — Brian D Nguyen
(74) *Attorney, Agent, or Firm* — Nutter McClennen & Fish LLP

(57) ABSTRACT

A wireless device initiates an Up-Link Trigger Based Multi-User communication by transmitting a trigger frame. The communication may be an Orthogonal Frequency Division Multiple Access communication. The trigger frame includes allocation information for resources of the communication, including Random Access (RA) allocation information. The trigger frame may also include a padding field after the allocation information. A length of the padding field is determined according to an amount of time needed for a station receiving the trigger frame to process the RA allocation information. The amount of time may correspond to a time between an end of a last RA allocation information and an end of a Physical layer Protocol Data Unit including the trigger frame. The amount of time may be determined according to a maximum processing time of stations associated with the wireless device, or may be determined according to a predetermined interval.

20 Claims, 10 Drawing Sheets

Related U.S. Application Data continuation of application No. 15/863,802, filed on Jan. 5, 2018, now Pat. No. 10,904,920.

(60) Provisional application No. 62/443,667, filed on Jan. 7, 2017.

(56) References Cited

U.S. PATENT DOCUMENTS

| | | | | |
|---|---|---|---|---|
| 2017/0272138 A1* | 9/2017 | Chun | | H04B 7/0613 |
| 2018/0146426 A1* | 5/2018 | Park | | H04L 27/2603 |
| 2019/0037058 A1* | 1/2019 | Asterjadhi | | H04L 69/324 |
| 2020/0274662 A1* | 8/2020 | Huang | | H04L 5/001 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications", IEEE Standards 802.11-2012 (Revision of IEEE Standard 802.11-2007), Mar. 29, 2012, pp. 1-2695, IEEE (The Institute of Electrical and Electronic Engineers, Inc.), New York, NY, USA.

* cited by examiner

FIG. 7B

Table 1:

| Element | definition | duration | DFT period | GI | Subcarrier spacing |
|---|---|---|---|---|---|
| L-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA}$ * 4 μs | 3.2 μs | 0.8 μs | 312.5 kHz |
| HE-SIG-B | HE SIGNAL B field | $N_{HESIGB}$ * 4 μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF}$ * (DFT period + GI)μs | 2xLTF: 6.4 μs 4xLTF: 12.8 μs | supports 0.8, 1.6, 3.2 μs | • 2xLTF: 156.25 kHz (equiv.); • 4xLTF: 78.125 kHz |
| HE-DATA | HE DATA field | $N_{DATA}$ * (DFT period + GI)μs | 12.8 μs | supports 0.8, 1.6, 3.2 μs | 78.125 kHz |

FIG. 8

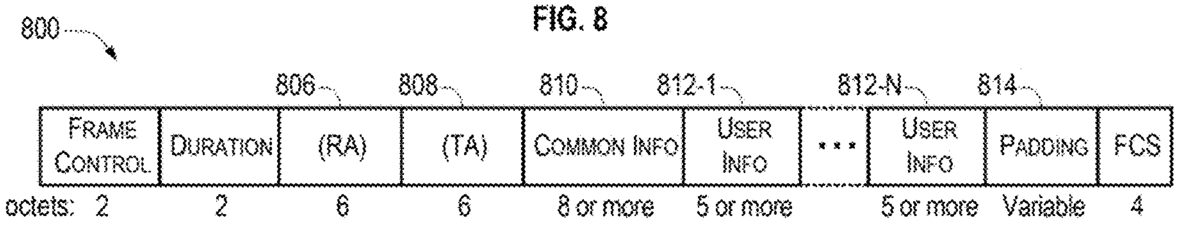

FIG. 9

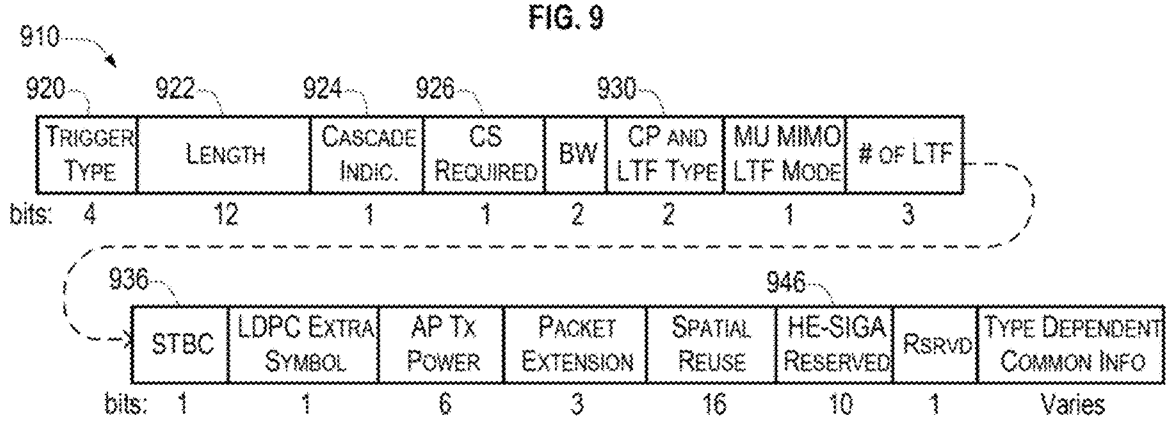

FIG. 10
Table 2
| Trigger Type Field Value | Description |
|---|---|
| 0 | Basic trigger |
| 1 | Beamforming Report Poll Trigger |
| 2 | MU-BAR |
| 3 | MU-RTS |
| 4-TBD | TBD/Reserved |
FIG. 11
Table 3
| CP and LTF Field Value | Description |
|---|---|
| 0 | 2x LTF + 0.8 μs CP |
| 1 | 2x LTF + 1.2 μs CP |
| 2 | 4x LTF + 3.2 μs CP |
| 3 | TBD/Reserved |
FIG. 12
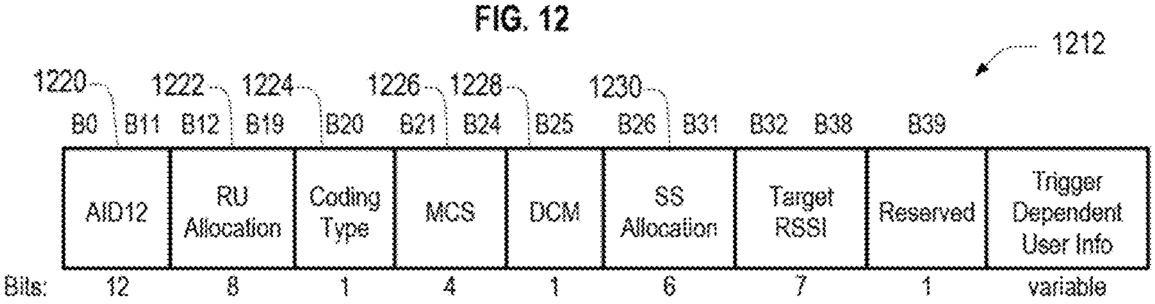
FIG. 13
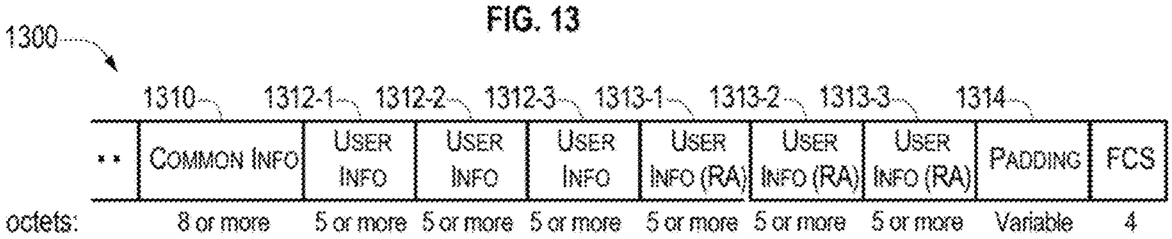
FIG. 14
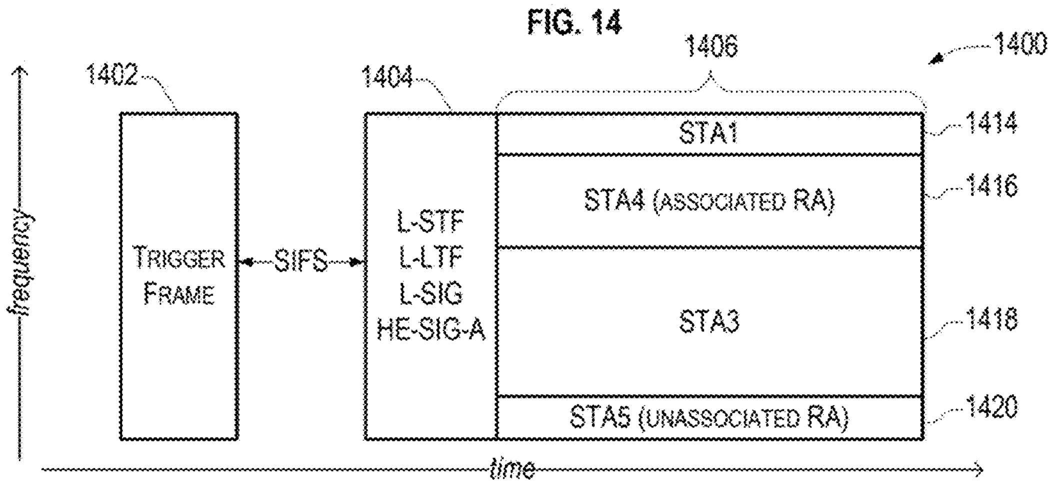

TRIGGER-BASED RANDOM ACCESS FOR WIRELESS DEVICE

CROSS-REFERENCE TO RELATED APPLICATION

This application is a continuation of U.S. patent application Ser. No. 17/139,884 filed Dec. 31, 2020, now U.S. Pat. No. 11,930,535 on Mar. 12, 2024, which is a continuation of U.S. patent application Ser. No. 15/863,802 filed Jan. 5, 2018, now U.S. Pat. No. 10,904,920 on Jan. 26, 2021, which claims the benefit of U.S. Provisional Application 62/443,667, filed on Jan. 7, 2017, the entire contents of which are incorporated herein by reference.

BACKGROUND

The technology described herein relates generally to wireless networking. More particularly, the technology relates generally to random access (RA) uplink communications performed in response to a trigger frame.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE 802.11). The IEEE Std 802.11™-2012 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac). These standards are each hereby incorporated by reference herein in their entirety.

The standards committee continues to work on new standards to improve upon the previously adopted standards. For example, the standards committee is currently working on IEEE 802.11ax that will define a high efficiency WLAN for enhancing the system throughput in high-density environments.

SUMMARY

Embodiments relate to wireless communications, and in particular to random access (RA) up-link (UL) communications performed in response to a trigger frame.

In an embodiment, a method of initiating, by a wireless device, an Up-Link (UL) Trigger Based (TB) Multi-User (MU) communication comprises allocating a plurality of resources for the UL TB MU communication. Allocating the plurality of resources including allocating one or more resources for Random Access (RA) communication. The method further comprises producing a plurality of information fields respectively indicating the allocations of the plurality of resources. Producing a plurality of information fields includes producing one or more RA information fields respectively indicating the one or more allocations of resources for RA communication. The method further comprises determining a padding length, producing a padding field having the padding length, producing a trigger frame including the plurality of information fields and the padding field. The trigger frame is to initiate the UL TB MU communication. The method further comprises transmitting, by the wireless device in a Physical layer Protocol Data Unit (PPDU), the trigger frame. The padding field is transmitted after the plurality of information fields, and the padding length is selected to ensure that a minimum amount of time is available for processing the trigger frame by stations receiving the trigger frame that may use the resource allocated by an RA information field of the one or more RA information fields to perform the UL TB MU communication.

In an embodiment, a wireless device comprises a radio frequency transmitter and a processor operable to generate a trigger frame. The wireless device is to allocate a plurality of resources for an Up-Link (UL) Trigger Based (TB) Multi-User (MU) communication. Allocate the plurality of resources includes allocating one or more resources for Random Access (RA) communication. The wireless device is further to produce a plurality of information fields respectively indicating the allocations of the plurality of resources. Producing the plurality of information fields includes producing one or more RA information fields respectively indicating the one or more allocations of resources for RA communication. The wireless device is further to determine a padding length, produce a padding field having the padding length, and produce, using the processor, a trigger frame including the plurality of information fields and the padding field. The trigger frame is to initiate the UL TB MU communication. The wireless device is further to transmit, in a Physical layer Protocol Data Unit (PPDU) and using the radio frequency transmitter, the trigger frame. The padding field is transmitted after the plurality of information fields. The padding length is selected to ensure that a minimum amount of time is available for processing the trigger frame by stations receiving the trigger frame that may use the resource allocated by an RA information field of the one or more RA information fields to perform the UL TB MU communication.

BRIEF DESCRIPTION OF THE DRAWINGS

FIG. 7B includes a table disclosing additional properties of fields of the HE PPDU of FIG. 7A, according to an embodiment.

FIG. 8 illustrates a Trigger frame according to an embodiment.

FIG. 9 illustrates a Common Info field of a Trigger frame according to an embodiment.

FIG. 10 shows a table of Trigger Type subfield encoding values that define the valid Trigger Type according to an embodiment.

FIG. 11 shows a table of Cyclic Prefix (CP) and Long Training Field (LTF) subfield encoding values that define the valid Trigger Type, according to an embodiment.

FIG. 12 illustrates a Per User Info field of a Trigger frame, according to an embodiment.

FIG. 13 illustrates a portion of a trigger frame including Random Access (RA) Per User Info fields, according to an embodiment.

FIG. 14 illustrates an UpLink (UL) Multi-User (MU) communication process according to an embodiment.

DETAILED DESCRIPTION

Figure 1:
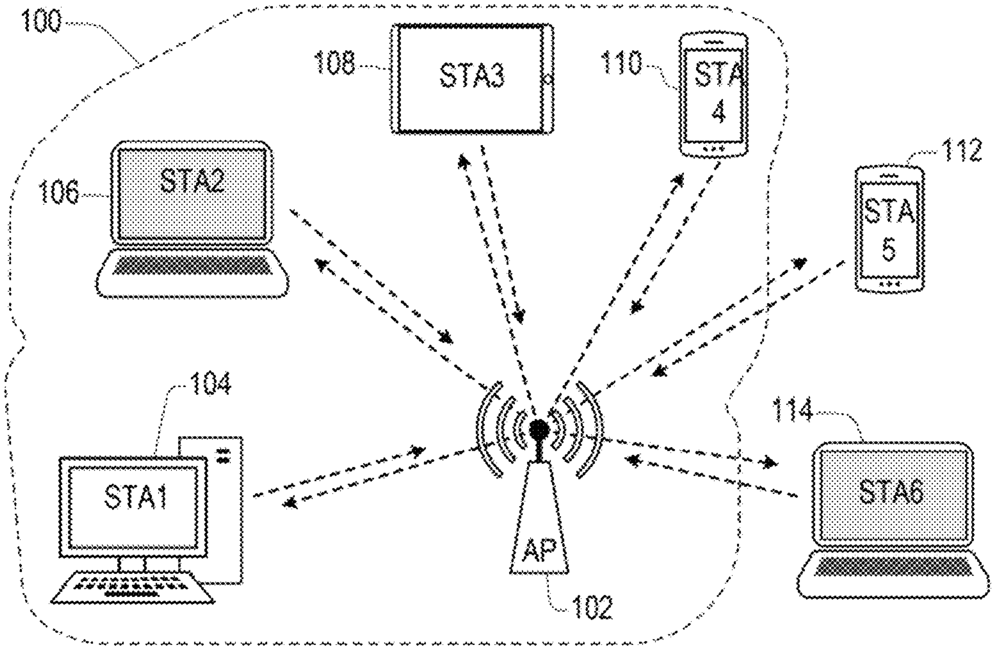
FIG. 1 illustrates a wireless network according to an embodiment.

The invention relates generally to wireless networking, e.g., providing Trigger-Based (TB) Random Access (RA) communications in wireless network using Orthogonal Frequency Division Multiple-Access (OFDMA). Random access communications are communications that do not use a resource assigned to one particular station, but that are instead contended for by one or more stations that have data to communicate. Trigger-based communications are communications performed in response to a trigger frame, such as a communication that is transmitted starting a fixed interval after the end of a transmission including the trigger frame and using resources allocated by the trigger frame.

In the following detailed description, certain illustrative embodiments have been illustrated and described. As those skilled in the art would realize, the described embodiments may be modified in various different ways without departing from the spirit or scope of the present disclosure. Accordingly, the drawings and description are to be regarded as illustrative in nature and not restrictive. Like reference numerals designate like elements in the specification.

WLAN devices are currently being deployed in diverse environments. These environments are characterized by the existence of many access points and non-AP stations in geographically limited areas. Increased interference from neighboring devices gives rise to performance degradation.

Furthermore, the WLAN devices are increasingly required to support a variety of applications such as video, cloud access, and cellular network offloading. In particular, video traffic is expected to be the dominant type of traffic in many high efficiency WLAN deployments. With the real-time requirements of some of these applications, WLAN users demand improved performance in delivering their applications, including improved power consumption for battery-powered devices.

Currently, an amendment to the IEEE Std 802.11™ (hereinafter, the IEEE 802.1 lax amendment) is being developed by the IEEE 802.11ax task group. The amendment will define a high efficiency WLAN for enhancing the system throughput in high-density scenarios and will improve power consumption for battery-powered devices.

Unlike previous amendments that focused on improving aggregate throughput, the IEEE 802.11ax amendment is focused on improving metrics that reflect user experience, such as average per station throughput, the 5th percentile of per station throughput of a group of stations, and area throughput. Improvements will target environments such as wireless corporate offices, outdoor hotspots, dense residential apartments, and stadiums.

The focus of the IEEE 802.11ax amendment is on indoor and outdoor operation of the WLAN in the 2.4 GHz and the 5 GHz frequency bands. Additional bands between 1 GHz and 6 GHz may be added as they become available. The WLAN according to the amendment may include a capability to handle multiple simultaneous communications in both spatial and frequency domains, in both uplink (UL) and downlink (DL) directions.

In a wireless network including trigger-based (TB) Up-Link (UL) random access (RA) communication, an amount of time between a transmission of an indication of the resources available for random access and a required time for beginning transmission of the TB UL RA communication should allow stations that may wish to participate in the TB UL RA communication sufficient time to process the indication of the resources available for random access. This should be true even when stations require different amounts of time to process the indication and the device transmitting the trigger frame that initiates the TB UL RA communication does not know which stations will use the resources available for random access.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point (AP) 102 wirelessly communicating with first, second, third, and fourth wireless devices (or stations) 104, 106, 108, and 110 (also referred as STA1, STA2, STA3, and STA4, respectively). The WLAN device may include a medium access control layer (MAC) and a physical layer (PHY) according to an IEEE (Institute of Electrical and Electronics Engineers) standard 802.11.

The AP 102 is a station, that is, a STA, configured to control and coordinate functions of the BSS 100. The AP 102 may transmit information to a single station selected from the plurality of stations STA1 to STA4 in the BSS 100 using a single frame, or simultaneously transmit information to two or more (e.g., to all six) stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may transmit data to the Access Point using a single frame, or transmit information to and receive information from another one of the stations STA1 to STA4 using a single frame.

The wireless network may also include stations not associated with the BSS 100, such as fifth and sixth stations 112 (STA5) and 114 (STA6) in FIG. 1. These unassociated stations STA5 and STA6 may receive transmissions from the AP 102, and may transmit transmissions to the AP 102 using random access opportunities that may become available.

For example, the unassociated stations STA5 and STA6 may each receive transmissions from and send transmissions to the AP102 as part of a process of associating themselves with the AP 102.

Each of the stations STA1 to STA6 and the Access Point AP includes a processor and a transceiver, and may further include a user interface and a display device. The processor is configured to generate a frame to be transmitted through a wireless network, to process a frame received through the wireless network, and to execute protocols of the WLAN. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions.

An access point may include a WLAN router, a stand-alone Access Point, a WLAN bridge, a Light-Weight Access Point (LWAP) managed by a WLAN controller, and the like. In addition, a station such as a personal computer or cellular phone may be able to operate as an access point, such as when a cellular phone is configured to operate as a wireless "hot spot."

A station may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. The management frame may be a frame used for exchanging management information that are not forwarded to higher layer of a communication protocol stack. The control frame may be a frame used for controlling access to a medium. The data frame may be a frame used for transmitting data to be forwarded to higher layer of the communication protocol stack.

Each frame's type and subtype may be identified using a type field and a subtype field included in a control field of the frame, as prescribed in the applicable standard.

Figure 2:
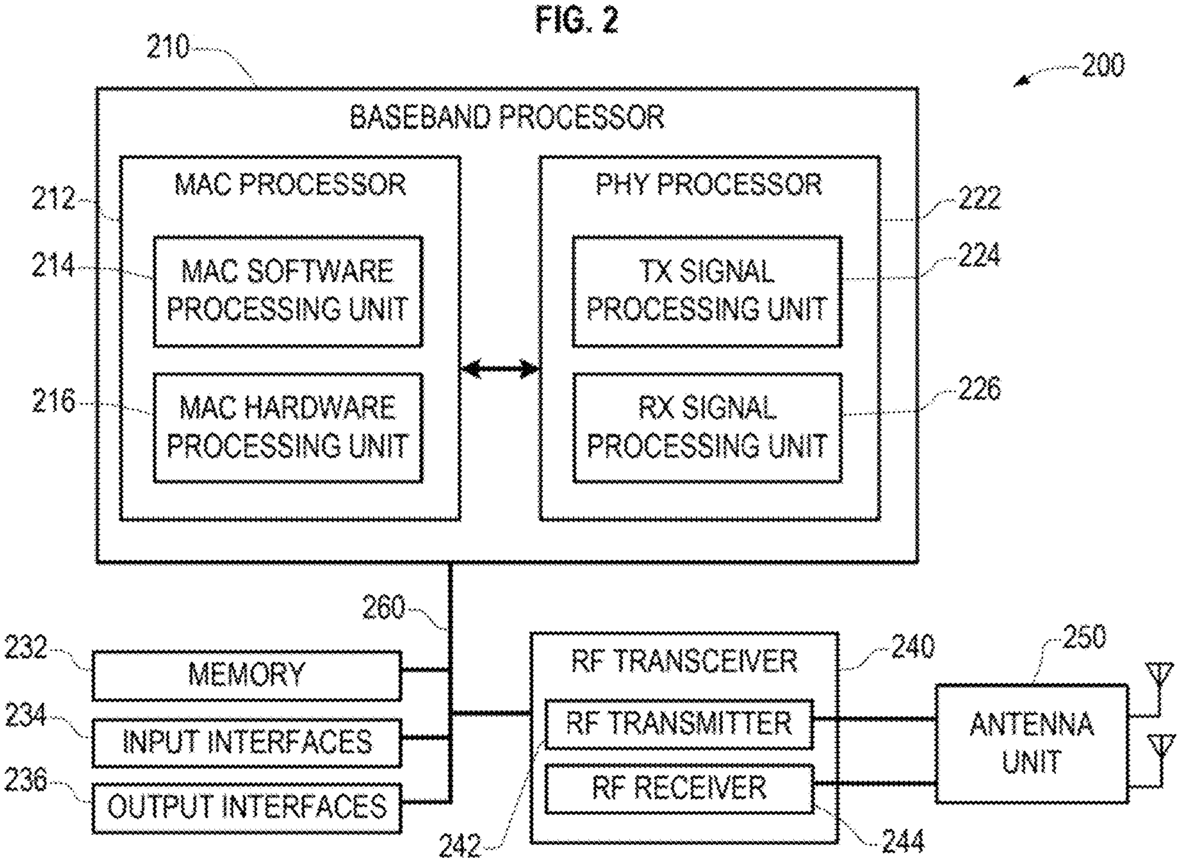
FIG. 2 illustrates a design of a wireless device according to an embodiment.

FIG. 2 illustrates a schematic block diagram of a wireless device 200 according to an embodiment. The wireless device 200 may be included in embodiments of one or more of the AP 102 and the stations 104 to 114 of the BSS 100 of FIG. 1.

The wireless or WLAN device 200 includes a baseband processor 210, a radio frequency (RF) transceiver 240, an antenna unit 250, a storage device (e.g., memory) 232, an input interface unit 234, and an output interface unit 236. The baseband processor 210, the memory 232, the input interface unit 234, the output interface unit 236, and the RF transceiver 240 may communicate with each other via a bus 260.

The baseband processor 210 performs baseband signal processing, and includes a MAC processor 212 and a PHY processor 222.

In an embodiment, the MAC processor 212 includes a MAC software processing unit 214 and a MAC hardware processing unit 216. The storage device (or memory) 232 may be a non-transitory computer readable media that stores software (i.e., computer programing instructions) hereinafter referred to as "MAC software." The MAC software processing unit 214 executes the MAC software to implement a first plurality of functions of the MAC layer. The MAC hardware processing unit 216 may implement a second plurality of functions of the MAC layer in special-purpose hardware, hereinafter referred to "MAC hardware." However, the MAC processor 212 is not limited thereto. For example, the MAC processor 212 may be configured to perform the first and second plurality of functions entirely in software or entirely in hardware according to implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation. In an embodiment, the PHY processor 222 may be configured to generate channel state information (CSI) according to information received from the RF transceiver 240.

The CSI may include one or more of a Received Signal Strength Indication (RSSI), a Signal to Interference and Noise Ratio (SINR), a Modulation and Coding Scheme (MCS), and a Number of Spatial Streams (NSS). CSI may be generated for one or more of a frequency block, a sub-band within the frequency block, a subcarrier within a frequency block, a receiving antenna, a transmitting antenna, and combinations of a plurality thereof.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The input interface unit 234 receives information from a user, and the output interface unit 236 outputs information to the user. The input interface unit 234 may include one or more of a keyboard, keypad, mouse, touchscreen, touch screen, microphone, and the like. The output interface unit 236 may include one or more of a display device, touch screen, speaker, and the like.

Many functions of the WLAN device 200 may be implemented in either hardware or software, and that which functions are implemented in software and which functions are implemented in hardware will vary according to constraints imposed on a design, which constraints may include one or more of design cost, manufacturing cost, time to market, power consumption, available semiconductor technology, and so on.

A wide variety of electronic devices, circuits, firmware, software, and combinations thereof known in the art may be used to implement the functions of the components of the WLAN device 200, and that the WLAN device 200 may include other widely-known components such as application processors, storage interfaces, clock generator circuits, power supply circuits, and the like, which have been omitted in the interest of brevity.

Figure 3:
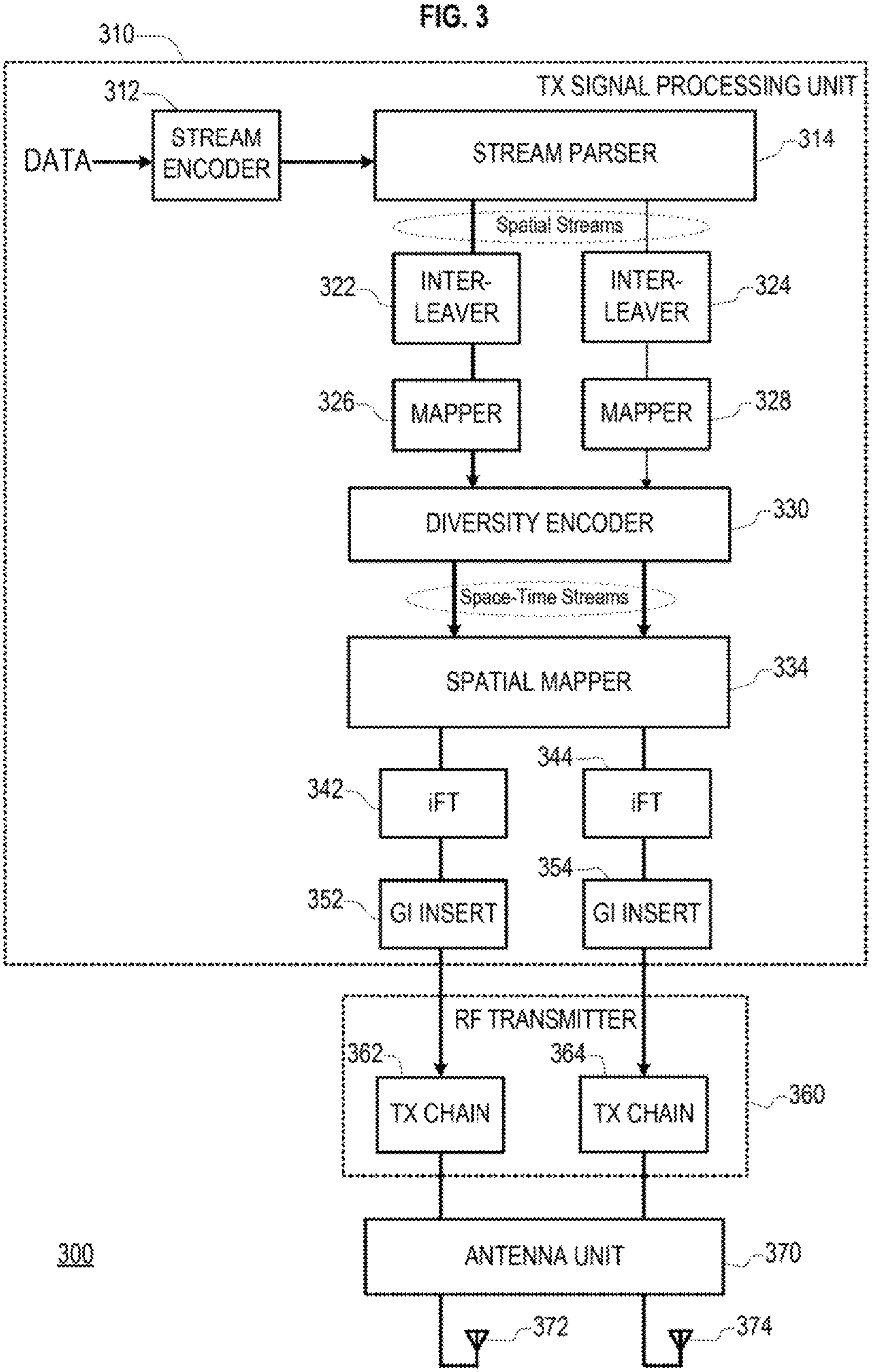
FIG. 3 illustrates components of a wireless device configured to transmit data according to an embodiment.

FIG. 3 illustrates components of a wireless device 300 configured to transmit data according to an embodiment, including a Transmission (Tx) Signal Processing Unit (TxSP) 310, and RF transmitter 360, an antenna unit 370, and first and second antennas 372 and 374. The TxSP 310, RF transmitter 360, and antenna unit 370 may be components of the transmitting signal processing unit 224, RF transmitter 242, and antenna unit 250 of the WLAN device 200 of FIG. 2 according to an embodiment.

The TxSP 310 includes a stream encoder 312, a stream parser 314, first and second interleavers 322 and 324, first and second mappers 326 and 328, a diversity encoder 330, a spatial mapper 334, first and second inverse Fourier Transformers (iFTs) 342 and 344, and first and second Guard Interval (GI) inserters 352 and 354.

The stream encoder 312 receives and encodes data. In an embodiment, the stream encoder 312 may include a Forward Error Correction (FEC) encoder. The FEC encoder may include a Binary Convolutional Code (BCC) encoder followed by a puncturing device, a Low-Density Parity-Check (LDPC) encoder, or one or more combinations thereof. A variety of circuits, software, algorithms, and combinations thereof are suitable for embodying the stream encoder 312.

In an embodiment, the TxSP 310 may further include a scrambler (not shown) for scrambling the input data before the encoding to reduce the probability of long sequences of 0s or 1s within the data. The TxSP 310 may further include an encoder parser (not shown) for demultiplexing the scrambled bits from the scrambler among a plurality of BCC encoders included in the FEC encoder when BCC encoding is used. The TxSP 310 may not use the encoder parser when LDPC encoding is used.

The stream parser 314 is configured to divide outputs of the encoder into one or more spatial streams. The stream parser 314 is shown dividing the outputs of the encoder into first and second spatial streams, that is, the Number of Spatial Streams ($N_{SS}$) is 2, but embodiments are not limited thereto, and in embodiments $N_{SS}$ may be 1, 3, 4, or more. In particular, wireless device 300 may dynamically control the number of spatial streams generated by the stream parser 314, such as when one or more transmit chains within the wireless device 300 are deactivated to save power.

The respective bits of the first and second spatial streams are interleaved by first and second interleavers 322 and 324 when BCC encoding is used. On the other hand, the first and second spatial streams may bypass the first and second interleavers 322 and 324, or may be passed through the first and second interleavers 322 and 324, respectively, when BCC encoding is not used.

The first and second mappers 326 and 328 map the sequence of bits of the first and second spatial stream to first and second sequences of constellation points, respectively. A constellation point may include a complex number representing an amplitude and a phase.

Within each of the first and second sequences of constellation points, the constellation points are divided into groups. Each group of constellation points corresponds to an OFDM symbol to be transmitted, and each constellation points in a group corresponds to a different subcarrier in the corresponding OFDM symbol.

The first and second mappers 326 and 328 may also perform LDPC tone mapping when LDPC encoding is used.

A wide variety of electronic devices, circuits, firmware, software, and combinations thereof known in the art may be used to implement the functions of the stream parser 314, the interleavers 322 and 324, and the mappers 326 and 328.

The diversity encoder 330 is configured to spread the constellation points from the spatial streams into a plurality of space-time streams in order to provide diversity gain, to implement Space-Time Block Coding (STBC), or both. Otherwise, one space-time stream may be output for each active spatial stream. In FIG. 3, the diversity encoder 330 is shown outputting two space-time streams, that is, a Number of Space-Time Streams ($N_{STS}$) is equal to 2, but embodiment are not limited thereto. Each space-time-stream corresponds to a different transmitting antenna or a different beam of a beamformed antenna array.

In an embodiment, $N_{STS}$ is twice $N_{SS}$ when STBC is used and $N_{STS}$ is equal to $N_{SS}$ when STBC is not used. For example, in an embodiment, when only one spatial stream is active in the TxSP 310, then the number of space-time streams output by the diversity encoder 330 may be one when the spatial stream is not encoded using STBC, and may be two when the spatial stream is encoded using STBC.

The diversity encoder 330 spreads each input constellation point output by the mappers 326 and 328 onto first and second output constellation points. The first output constellation points is included in a first space-time stream and the second output constellation point is included in a second space time stream different from the first space time stream.

In an embodiment, the first output constellation point has a value corresponding to a value of the input constellation point, and the second output constellation point has a value corresponding to a complex conjugate of the value of the input constellation point or to a negative of the complex conjugate (i.e., a negative complex conjugate). The first output constellation point is at a different time slot (that is, in a different OFDM symbol period) than the second output constellation point when space-time block coding (STBC) is used.

The spatial mapper 334 maps the space-time streams to one or more transmit chains. The spatial mapper maps the space-time stream to the transmit chains using a one-to-one correspondence when direct mapping is used. The spatial mapper maps each constellation point in each space-time stream to a plurality of transmit chains when spatial expansion or beamforming is used. Mapping the space-time streams to the transmit chains may include multiplying constellation points of the space time streams associated with an OFDM subcarrier by a spatial mapping matrix associated with the OFDM subcarrier.

The first and second iFTs 342 and 344 convert blocks of constellation points output by the spatial mapper 334 to a time domain block (i.e., a symbol) by applying an inverse discrete Fourier transform (iDFT) or an inverse fast Fourier transform (iFFT) to each block. A number of constellation points in each block corresponds to a number of subcarriers in each symbol. A temporal length of the symbol corresponds to an inverse of the subcarrier spacing.

When Multi-Input Multi-Output (MIMO) or Multi-User MIMO (MU-MIMO) transmission is used, the TxSP 310 may insert Cyclic Shift Diversities (CSDs) to prevent unintentional beamforming. The CSD may be specified per transmit chain or may be specified per space-time stream.

The CSD insertion may occur before or after the iFTs 342 and 344. In an embodiment, the CSD may be applied by the spatial mapper 334.

The first and second GI inserters 352 and 354 prepend a Guard Interval (GI) to the symbol. The TxSP 310 may optionally perform windowing to smooth edges of each symbol after inserting the GI.

A wide variety of electronic devices, circuits, firmware, software, and combinations thereof known in the art may be used to implement the functions of the spatial mapper 334, the iFTs 342 and 344, and the GI inserters 352 and 354.

The RF transmitter 360 includes first and second transmit chains 362 and 364. The transmit chains 362 and 364 convert the symbols output from the respective GI inserters 352 and 354 into respective first and second RF transmit signals. In an embodiment, one of the first and second transmit chains 362 and 364 may at times be disabled to save power.

The antenna unit 370 couples the first and second RF transmit signals output by the RF transmitter 360 to the first and second antennas 372 and 374. The antennas 372 and 374 couple the first and second RF transmit signals, respectively, to the wireless medium.

Figure 4:
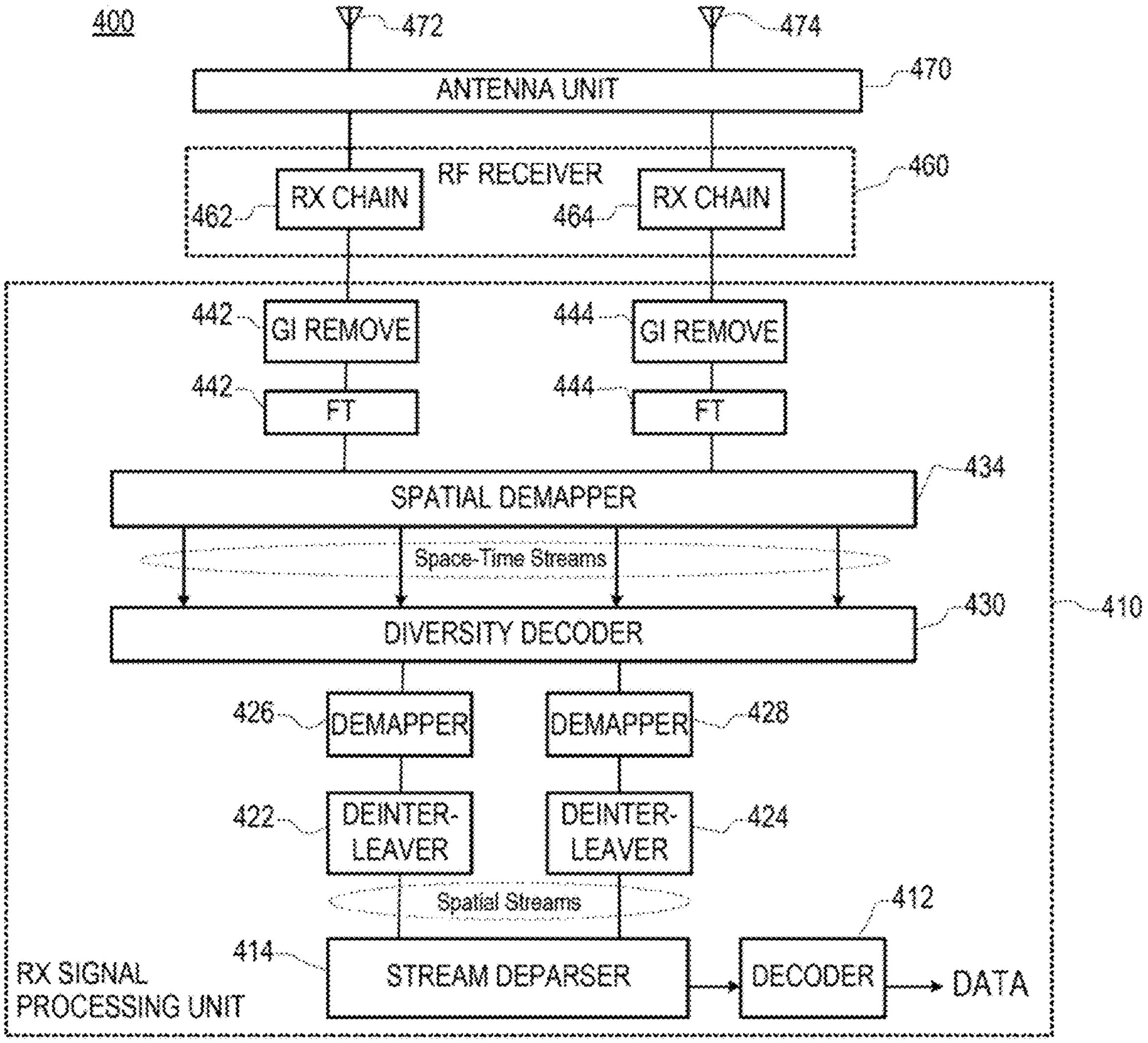
FIG. 4 illustrates components of a wireless device configured to receive data according to an embodiment.

FIG. 4 illustrates components of a wireless device 400 configured to receive data according to an embodiment, including a Receiver (Rx) Signal Processing Unit (RxSP) 410, an RF receiver 460, an antenna unit 470, and first and second antennas 472 and 474. The RxSP 410, RF receiver 460, and antenna unit 470 may be components of the receiving signal processing unit 226, RF receiver 245, and antenna unit 250 of the WLAN device 200 of FIG. 2 according to an embodiment. The antenna unit 470 and antennas 472 and 474 may also operate as the antenna unit 370 and antennas 372 and 374 of FIG. 3.

The antennas 472 and 474 receive first and second RF received signals, respectively, from the wireless medium. The antenna unit 470 couples the first and second RF received signals to the RF receiver 460.

The RF receiver 460 includes first and second receive chains 462 and 464. The receive chains 462 and 464 convert the first and second RF received signals into first and second received symbol streams, respectively.

Although FIG. 4 illustrates the wireless device 400 including two antennas 472 and 474 and two receive chains 462 and 464, embodiments are not limited thereto, and an embodiment may have one, three, four, or more receiving antennas and corresponding receive chains.

In an embodiment, the wireless device is a first wireless device receiving signals transmitted by a second wireless device, and a first number of antennas and receive chains used by the first wireless device to receive the signals is different from a second number of antennas and transmit chains used by the second wireless device to transmit the signals.

The Receiver (Rx) Signal Processing Unit (RxSP) 410 receives the first and second received symbol streams. The RxSP 410 includes first and second Guard Interval (GI) removers 452 and 454, first and second Fourier Transformers (FTs) 442 and 444, a spatial demapper 434, a diversity decoder 430, first and second demappers 426 and 428, first and second deinterleavers 422 and 424, a stream deparser 414, and a stream decoder 412.

In an embodiment, each of the illustrated components of the RxSP 410 performs a function corresponding to an inverse of a function performed by a corresponding illustrated component of the TxSP 310 of FIG. 3.

The Guard Interval (GI) removers 452 and 454 removes the GI from the symbol in the first and second received symbol streams, respectively.

The FTs 442 and 444 receive the first and second received symbol streams from the GI removers 452 and 454, respectively. The FTs 442 and 444 convert blocks of received symbols (that is, time domain blocks) in the first and second received symbol streams into blocks of the constellation points (that is, frequency domain blocks), respectively, by using a discrete Fourier transform (DFT) or a fast Fourier transform (FFT).

A number of constellation points in each frequency domain block corresponds to a number of subcarriers in each received symbol. A number of received symbols in each time domain blocks corresponds to the number of constellation points in each block.

The FTs 442 and 444 output the blocks of the constellation points as first and second constellation point streams, respectively.

The spatial demapper 434 reconstructs and outputs space-time streams when one or more of STBC, MIMO, and MU-MIMO is used to transmit the received signals. The space-time streams are associated with transmissions from respective antennas or from respective beams of a beam-formed antenna array. Each space-time stream includes a plurality of constellation points.

The spatial demapper 434 may reconstruct first to fourth space-time streams using the first and second constellation point streams and a plurality of channel state information (CSI). The plurality of CSI may include CSI for each combination of a transmitting antenna used by the transmitting device to transmit a spatial stream as a plurality of space-time streams and the antennas used by a receiving device to receive the space-time streams.

For example, when a first spatial stream is transmitted by the device of FIG. 3 as first and second space-time streams using the transmitting device's first and second antennas 372 and 374 and the first and second space-time streams are received by the device of FIG. 4 using the receiving device's first and second receive antennas 472 and 474, a first plurality of CSI is used to reconstruct the first and second space-time streams. The first plurality of CSI includes CSI for a channel including the first antenna 372 and the first receive antenna 472, CSI for a channel including the first antenna 372 and the second receive antenna 474, CSI for a channel including the second antenna 374 and the first receive antenna 472, and CSI for a channel including the second antenna 374 and the second receive antenna 474.

The spatial demapper 434 outputs the first and second constellation point streams when none of STBC, MIMO, and MU-MIMO are used to transmit the received signals. A variety of circuits, software, algorithms, and combinations thereof are suitable for embodying the spatial demapper 434.

The diversity decoder 430 despreads the constellation points from the first to fourth space-time streams into first and second spatial streams.

The diversity decoder 430 may determine each output constellation point in the first and second spatial streams using a constellation point from each of two different space-time streams. For example, each constellation point in the first spatial stream may be determined using one constellation point from each of the first and second space-time streams. Each constellation point in the second spatial stream may be determined using one constellation point from each of the third and fourth space-time streams in the same manner as the constellation point in the first spatial stream are determined.

Each constellation point in the first spatial stream may be determined using a constellation point of the first space-time stream corresponding to a first time slot and a first subcarrier frequency and a constellation point of the second space-time stream corresponding to a second time slot and the first subcarrier frequency when STBC is used. For example, considering FIG. 4, a first constellation point of the first spatial stream may be determined using the first output constellation point 432 of the first space-time stream STS1 and the fourth output constellation point 454 of the second space-time stream STS2 when STBC is used.

A variety of circuits, software, algorithms, and combinations thereof that are suitable for determining the constellation points of the spatial streams produced by diversity decoder 430.

The demappers 426 and 428 demap the constellation points of the first and second spatial streams into bit streams, respectively. The demappers 426 and 428 may further perform LDPC tone demapping before the constellation demapping when LDPC is used.

The deinterleavers 422 and 424 deinterleave the bits of the first and second spatial streams received from the demappers 426 and 428, respectively, when BCC encoding is used.

The stream deparser 414 combines the spatial streams output from the deinterleavers 422 and 424.

The stream decoder 412 decodes the combined spatial streams output from the stream deparser 414. For example, the stream decoder 412 may be an FEC decoder. The FEC decoder may include a BCC decoder, an LDPC decoder, or both.

The RxSP 410 may further include a descrambler for descrambling the decoded data. The RxSP 410 may further include an encoder deparser for multiplexing the data decoded by a plurality of BCC decoders when BCC is used. The RxSP 410 may not use the encoder deparser when LDPC is used.

Figure 5:
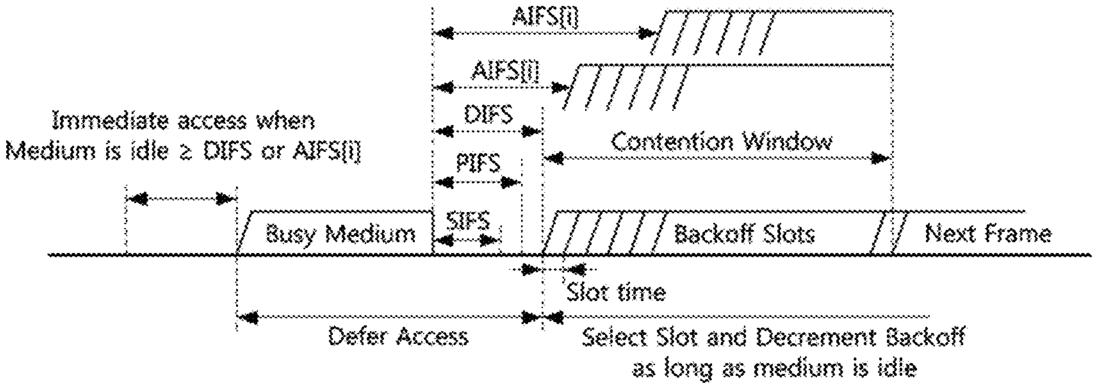
FIG. 5 illustrates Inter-Frame Space (IFS) relationships.

FIG. 5 illustrates Inter-Frame Space (IFS) relationships. FIG. 5 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 5 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 6:
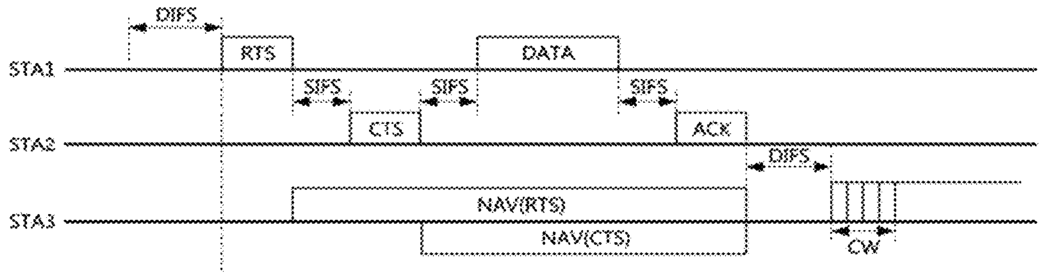
FIG. 6 illustrates a Carrier Sense Multiple Access/Collision Avoidance (CSMA/CA) based frame transmission procedure.

FIG. 6 illustrates a Carrier Sense Multiple Access/Collision Avoidance (CSMA/CA) based frame transmission procedure for avoiding collision between frames in a channel according to an embodiment. FIG. 6 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

Figure 7A:
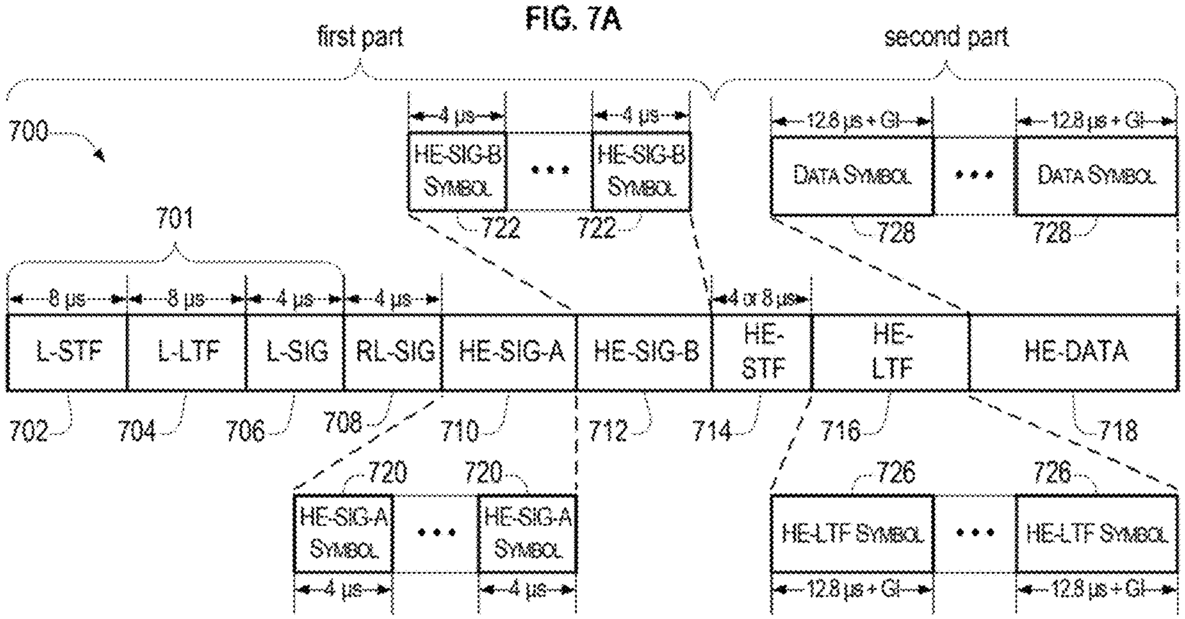
FIG. 7A illustrates a High Efficiency (HE) Physical layer Protocol Data Unit (PPDU), according to an embodiment.

FIG. 7A illustrates an HE PPDU 700 according to an embodiment. A transmitting station generates the HE PPDU 700 and transmits it to one or more receiving stations. The receiving stations receive, detect, and process the HE PPDU 700.

The HE PPDU 700 includes a Legacy Short Training Field (L-STF) field 702, a Legacy (i.e., a Non-High Throughput (Non-HT)) Long Training Field (L-LTF) 704, and a Legacy Signal (L-SIG) field 706, which together comprise a legacy preamble 701, and a Repeated L-SIG field (RL-SIG) 708. The L-STF 704 of a non-trigger-based PPDU has a periodicity of 0.8 μs with 10 periods.

The HE PPDU 700 also includes an HE-SIG-A field 710, an optional HE-SIG-B field 712, an HE-STF 714, an HE-LTF 716, and an HE-Data field 718.

The legacy preamble 701, the RL-SIG field 708, the HE-SIG-A field 710, and the HE-SIG-B field 712 when present, comprise a first part of the HE PPDU 700. In an embodiment, the first part of the HE PPDU 700 is decoded using a 64-element Discrete Fourier Transform (DFT), having a basic subcarrier spacing of 312.5 KHz.

The HE-SIG-A field 710 is duplicated on each 20 MHz segment after the RL-SIG field 708 to indicate common control information. The HE-SIG-A field 710 includes a plurality of OFDM HE-SIG-A symbols 720 each having a duration (including a Guard Interval (GI)) of 4 μs. A number of the HE-SIG-A symbols 720 in the HE-SIG-A field 710 is indicated by $N_{HESIGA}$ and is either 2 or 4.

The HE-SIG-B field 712 is included in Down-Link (DL) Multi-User (MU) PPDUs. The HE-SIG-B field 712 includes a plurality of OFDM HE-SIG-B symbols 722 each having a duration including a Guard Interval (GI) of 4 μs. In embodiments, Single User (SU) PPDUs, Up-Link (UL) MU PPDUs, or both do not include the HE-SIG-B field 712. A number of the HE-SIG-B symbols 722 in the HE-SIG-B field 712 is indicated by $N_{HESIGB}$ and is variable.

When the HE PPDU 700 has a bandwidth of 40 MHz or more, the HE-SIG-B field 712 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 700, and may contain different information. Within this document, the term "HE-SIG-B field" may refer to an HE-SIG-B field of a 20 MHz PPDU, or to either of an HE-SIG-B1 field or HE-SIG-B2 field of a 40 MHz or more PPDU.

An HE-STF 714 of a non-trigger-based PPDU has a periodicity of 0.8 μs with 5 periods. A non-trigger-based PPDU is a PPDU that is not sent in response to a trigger frame. An HE-STF 714 of a trigger-based PPDU has a periodicity of 1.6 μs with 5 periods. Trigger-based PPDUs include UL PPDUs sent in response to respective trigger frames.

The HE-LTF 716 includes one or more OFDM HE-LTF symbols 726 each having a duration of 12.8 μs plus a Guard Interval (GI). The HE PPDU 700 may support a 2×LTF mode and a 4×LTF mode. In the 2×LTF mode, an HE-LTF symbol 726 excluding a Guard Interval (GI) is equivalent to modulating every other tone in an OFDM symbol of 12.8 μs excluding the GI, and then removing the second half of the OFDM symbol in a time domain. A number of the HE-LTF symbols 726 in the HE-LTF field 716 is indicated by $N_{HELTF}$, and is equal to 1, 2, 4, 6, or 8.

The HE-Data field 718 includes one or more OFDM HE-Data symbols 728 each having a duration of 12.8 μs plus a Guard Interval (GI). A number of the HE-Data symbols 728 in the HE-Data field 718 is indicated by $N_{DATA}$ and is variable.

FIG. 7B shows a Table 1 indicating additional properties of the fields of the HE PPDU 700 of FIG. 7A, according to an embodiment.

The descriptions below, for sake of completeness and brevity, refer to OFDM-based 802.11 technology. Unless otherwise indicated, a station refers to a non-AP HE STA, and an AP refers to an HE AP.

The solutions provided herein have been described with reference to a wireless LAN system; however, it should be understood that these solutions are also applicable to other network environments, such as cellular telecommunication networks, wired networks, etc.

An embodiment of the invention may be an article of manufacture in which a non-transitory machine-readable medium (such as microelectronic memory) has stored thereon instructions which program one or more data processing components (generically referred to here as a "processor" or "processing unit") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

In this disclosure, multi-user (MU) transmission refers to cases that multiple frames are transmitted to or from multiple STAs simultaneously using different resources, wherein examples of different resources are different frequency resources in OFDMA transmission and different spatial streams in MU-MIMO transmission. Therefore, DL-OFDMA, DL-MU-MIMO, UL-OFDMA, and UL-MU-MIMO are examples of MU transmission.

Different from DL MU-MIMO defined in IEEE 802.11ac standard, IEEE 802.11ax supports not only DL MU transmission but also UL MU transmission. Additionally, in the IEEE 802.11ax environment, the AP may have more control of the medium by use of more scheduled access mechanisms, which may result in more frequent use of OFDMA and/or MU-MIMO transmissions.

UL MU PPDUs (MU-MIMO or OFDMA) are sent as a response to a Trigger frame sent by the AP. Trigger frame may have enough STA specific information and assigned resource units to identify the STAs which are supposed to transmit UL MU PPDUs.

FIG. 8 illustrates a Trigger frame 800 according to an embodiment. The Trigger frame 800 is used to allocate resource for UL MU transmission and to solicit the UL MU transmission after the PPDU that carries the Trigger frame 800. The Trigger frame also carries other information required by the responding one or more STAs to send the UL MU transmission.

The Trigger frame 800 includes a Common Info field 810 and one or more User Info fields 812-1 to 812-N. The Receive station Address (RA) field 806 of the Trigger frame 800 is the address of the recipient STA when the Trigger frame 800 has only one User Infor field 812-1. The RA field 806 of the Trigger frame 800 is a broadcast address when the Trigger Frame 800 has multiple User Info field 812-1 to 812-N. The Transmitting station Address (TA) field 808 is the address of the STA transmitting the Trigger frame 800.

The Trigger frame 800 may include a Padding field 814. A length and the presence of the Padding field 814 may be determined per embodiments of this disclosure.

FIG. 9 illustrates a Common Info field 910 of a Trigger frame, such as the Trigger Frame 800 of FIG. 8, according to an embodiment. The Common Info field includes a Trigger Type subfield 920, a length subfield 922, a Cascade Indication subfield 924, a CS Required subfield 926, a Cyclic Prefix (CP) and LTF type subfield 930, a Space Time Block Coding (STBC) field 936, and a HE-SIG-A Reserved subfield 946, among others.

The Trigger Type subfield 920 of the Common Info field 910 indicates the type of the Trigger frame. The Trigger frame may include an optional type-specific Common Info and optional type-specific Per User Info. FIG. 10 shows a Table 2 of Trigger Type subfield 920 encoding values that define the valid Trigger Type.

The Length subfield 922 of the Common Info field 910 indicates the value of the L-SIG Length field of the HE trigger-based PPDU that is the response to the Trigger frame.

If the Cascade Indication subfield 924 of the Common Info field 910 is 1, then a subsequent Trigger frame follows the current Trigger frame. Otherwise the Cascade Indication subfield is 0.

The CS Required subfield 926 of the Common Info field 910 is set to 1 to indicate that the STAs identified in the Per User Info fields of the Trigger frame are required to use Energy Detection (ED) to sense the medium and to consider the medium state and the NAV in determining whether or not to respond. The CS Required subfield is set to 0 to indicate that the STAs identified in the Per User Info fields are not required to consider the medium state or the NAV in determining whether to respond.

The CP and LTF Type subfield 930 of the Common Info field 910 indicates the CP and HE-LTF type of the HE trigger-based PPDU response. The CP and LTF subfield encoding is defined in Table 3 shown in FIG. 11.

The STBC subfield 936 of the Common Info field 910 indicates the status of STBC encoding of the HE trigger-based PPDU response solicited by the Trigger frame 900. It is set to 1 if STBC encoding is to be used and set to 0 otherwise.

The HE-SIG-A Reserved subfield 946 of the Common Info field 910 indicates the content of the HE-SIG-A field of the HE trigger-based PPDU response. The values of the HE-SIG-A Reserved subfield 946 are set to 1 and correspond to the bits B7 to B15 in the HE-SIG-A2 subfield of the HE trigger-based PPDU with B54 in the Trigger frame corresponding to B7 in the HE-SIG-A2 subfield of the HE trigger-based PPDU, B55 corresponding to B8, and so on.

FIG. 12 illustrates a Per User Info field 1212 of a Trigger Frame, such as the Trigger Frame 800 of FIG. 8, according to an embodiment. The Trigger Frame may include one or more Per User Info fields 1212, transmitted one after the other.

The Per User Info field 1212 includes a User Identifier subfield 1220, an RU Allocation subfield 1222, a Coding Type subfield 1224, a Modulating and (MCS) subfield 1226, a Duel Carrier Modulation subfield 1228, and a Spatial Stream (SS) allocation subfield 1230, among other subfields.

The User Identifier subfield 1220 (or 12-bit Association ID (AID12)) indicates an Association Identifier (AID) of a station allocated a Resource Unit (RU) in which to transmit one or more MPDU(s) in the HE trigger-based PPDU transmitted in response to the Trigger frame that includes the Per User Info field 1212.

When the User Identifier subfield 1220 has a value indicating Random Access (for example, 0), the User Identifier subfield 1220 does not identify a particular station, but instead indicates that the information in the Per User Info field 1212 applies to an UL Random Access (RA) opportunity.

The RU Allocation subfield 1222 indicating an RU to be used to transmit the HE trigger-based PPDU of the station identified by User Identifier subfield 1220. When the User Identifier subfield 1220 has a value indicating RA, no explicit station is identified, and instead a station using the applicable random access procedure is permitted to contend for use of the indicated RU. The first bit of the RU Allocation subfield 1222 indicates whether the allocated RU is located in a primary or non-primary 80 MHz. The mapping of the subsequent seven bits of the RU Allocation subfield 1222 indicates the RU allocation according to the IEEE Std 802.11ax OFDMA numerology.

The Coding Type subfield 1224 indicates a coding type of the HE trigger-based PPDU transmitted in response to the Trigger frame of the station identified by the User Identifier subfield 1220, and set to 0 for BCC and to 1 for LDPC.

The MCS subfield 1226 indicates a Modulation and Coding Scheme (MCS) of the HE trigger-based PPDU transmitted in response to the Trigger frame by the station identified by User Identifier subfield 1220.

The Dual Carrier Modulation (DCM) subfield 1228 indicates dual carrier modulation of the HE trigger-based PPDU transmitted in response to the Trigger frame by the station identified by User Identifier subfield 1220. A value of 1 indicates that the HE trigger-based PPDU shall use DCM, and a value of 0 indicates that it shall not.

The Spatial Stream (SS) Allocation subfield 1230 indicates spatial streams of the HE trigger-based PPDU transmitted in response to the Trigger frame by the station identified by User Identifier subfield 1220.

UL OFDMA-based random access is a mechanism for HE STAs to randomly select resource units (RUs) assigned by an HE AP in a Trigger frame that contains RUs for random access. The HE AP may transmit the Trigger frame that contains one or more RUs for random access which are identified in a Per User field of the Trigger frame, the Per User Info field having an AID12 subfield (or User Identifier subfield) set to one of one or more predefined RA-indicating values (for example, 0).

FIG. 13 illustrates a final portion of a Trigger Frame 1300 having one or more RA-indicating Per User Info fields. The Per User info fields are transmitted after the Common Info field 1310 and before the MAC padding field 1314 (if present), which respectively correspond to the Common Info field 810 and the padding field 814 of the Trigger Frame 800 of FIG. 8.

Per User Info fields 1312-1, 1312-2, and 1312-3 include AID12 subfields that do not correspond to an UL RA opportunity. For example, the Per User Info fields 1312-1, 1312-2, and 1312-3 may include respective AID12 subfields indicating first, second and third associated stations, respectively. The Per User Info fields 1312-1 to 1312-3 indicating particular stations occur before any of the Per User Info fields that include information for an UL RA opportunity.

Per User Info fields 1313-1, 1313-2, and 1313-3 include AID12 subfields that correspond to an UL RA opportunity. For example, the Per User Info fields 1313-1, 1313-2, and 1313-3 may include respective AID12 subfields indicating a first UL RA opportunity, a second UL RA opportunity, and a third UL RA opportunity, respectively. All of the Per User Info fields 1313-*x* indicating information for UL RA opportunities occur after all of the Per User Info fields that include an AID12 subfield indicating a particular station.

FIG. 14 illustrates an UL MU communication exchange according to an embodiment. The sequence includes an UL MU PPDU 1400 and a trigger frame 1402. The UL MU PPDU 1400 may employ OFDMA, MU MIMO, or any combination thereof. The UL MU PPDU 1400 is transmitted, in response to the trigger frame 1402, by a plurality of stations.

An AP initiates the UL MU communication by sending the trigger frame 1402 to a plurality of stations associated with the AP. The trigger frame 1402 may allocate one or more resource units (RUs) in the subsequent UL MU PPDU 1400 to respective stations of the plurality of stations associated with the AP, and zero or more RUs in the UL MU PPDU 1400 to respective random access (RA) opportunities for stations. Each of the RA opportunities may be for associated stations or for unassociated stations.

In an illustrative example described with respect to FIG. 1, the AP 102 transmits the trigger frame 1402 that includes a first Per User field allocating a first RU 1414 to the first station STA1, a second Per User field allocating a third RU 1418 to the third station STA3, a third Per User field allocating a second RU 1416 to an RA opportunity for stations associated with the AP 102, and a fourth Per User field allocating a fourth RU 1420 to an RA opportunity for stations not associated with the AP 102.

The trigger frame 1402 also includes one or more PHY and MAC attributes that the stations participating in transmitting the UL MU PPDU 1400 shall apply.

An IFS interval (such as a SIFS) after the transmission of the last symbol of a PPDU including the trigger frame 1402, the stations designated in the trigger frame 1402 may simultaneously send their respective UL OFDMA frames (which frames are trigger-based frames) to the transmitter of the trigger frame 1402, which UL OFDMA frames air-combine (i.e., radio-frequency (RF) combine) to form the UL MU PPDU 1400. In addition, stations not explicitly designated in the trigger frame 1402 may attempt to send respective UL OFDMA frames using any appropriate RA opportunity allocated in the trigger frame 1402.

In the illustrative example using FIG. 1, the first station STA1 sends its UL OFDMA frame to the AP 102 using the first RU 1414 allocated to the first station STA1, and the third station STA3 sends it UL OFDMA frame to the AP 102 using the third RU 1418 allocated to the third station STA3. The fourth station STA4 sends it UL OFDMA frame to the AP 102 using the second RU 1416 allocated to a first RA opportunity. The fifth station STA5, which is not associated with the AP 102, sends it UL OFDMA frame to the AP 102 using the fourth RU 1420 allocated to a second RA opportunity.

The UL MU PPDU 1400 includes a first portion 1404 including an L-STF, an L-LTF, and an L-SIG field based on IEEE Std 802.11n and 802.11ac. The symbols in these fields make the UL MU PPDU 1400 compatible with legacy designs and products.

The L-STF, L-LTF, and L-SIG symbols of the first portion 1404 are modulated using a Fourier Transform (FT) size of 64 on a 20 MHz channel and are duplicated within each 20 MHz channel of the UL MU PPDU 1400 when the UL MU PPDU 1400 has a bandwidth wider than 20 MHz.

The first portion 1404 also includes an HE-SIG-A field. The symbols of the HE-SIG-A field may carry necessary information regarding each Physical layer Service Data Unit (PSDU) and regarding the RF, PHY, and MAC properties of the UL MU PPDU 1400.

In an embodiment, the HE SIG-A field of the first portion 1404 may be modulated using an FT size of 64. In another embodiment, the HE SIG-A field of the first portion 804 may be modulated using an FT size of 256.

All of the stations (STA1, STA3, STA4, and STA5) transmit identical first portions 1404 in their respective UL OFDMA frames. As a result, the first portions 1404 of the respective UL OFDMA frames transmitted by stations STA1, STA3, STA4, and STA5 combine together without losing information.

The UL MU PPDU 1400 includes an MU payload region 1406. The MU payload region 1406 includes first, second, third, and fourth RU 1414, 1416, 1418, and 1420 transmitted by the first, second, third, and fourth stations STA1, STA4, STA3, and STA5, respectively. Because each of the stations STA1, STA4, STA3, and STA5 uses a different RU for the MU payload region 1406, the MU payload region 1406 of the respective UL OFDMA frames transmitted by stations STA1, STA3, STA4, and STA5 combine together without losing information.

Figure 15:
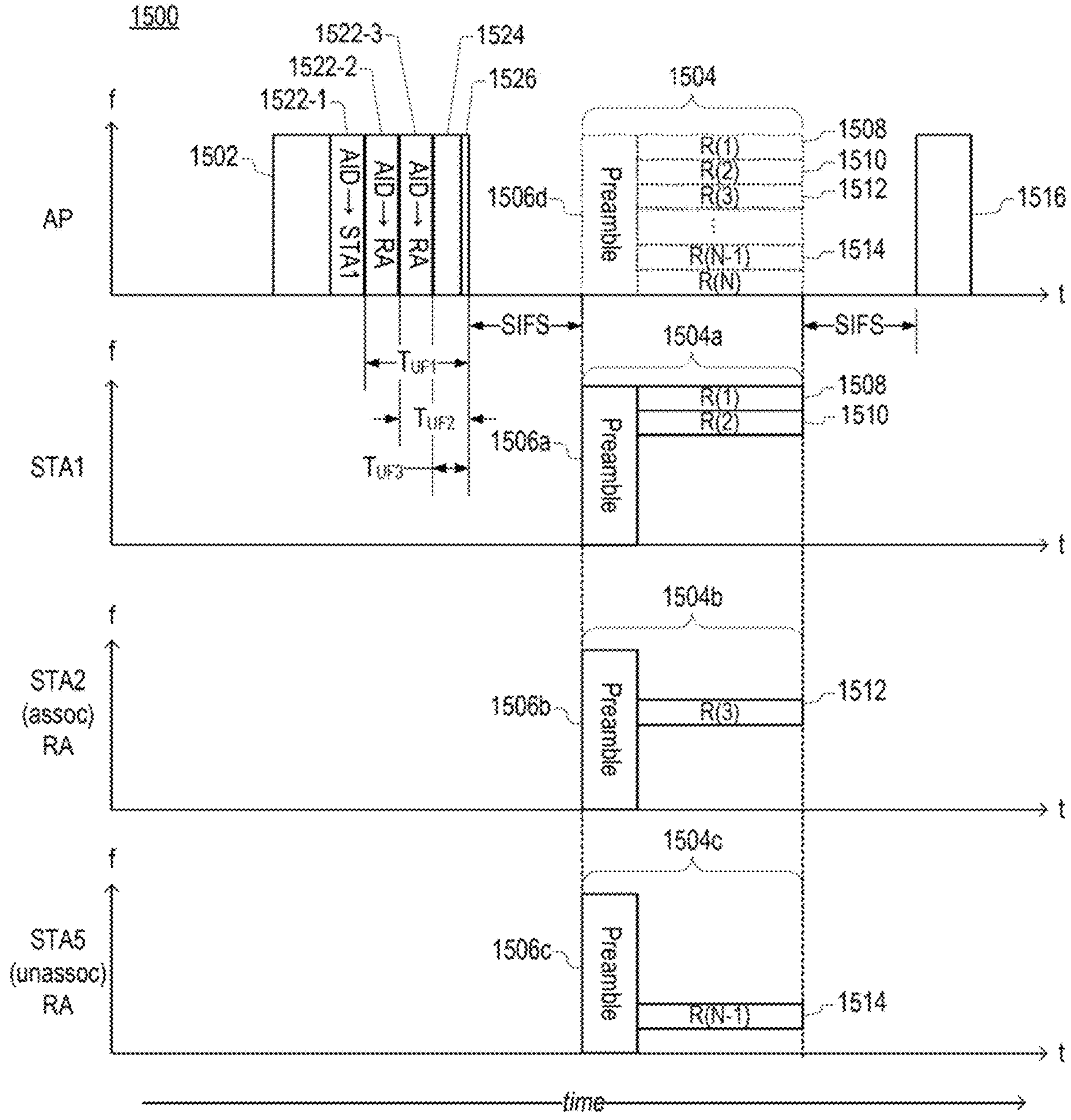
FIG. 15 illustrates a process for a Trigger-based UL MU transmission including random access channels according to an embodiment.

FIG. 15 illustrates a process 1500 for an UL MU transmission including one or more random access channels according to an embodiment. The process 1500 is illustrated for a UL MU using a 20 MHz bandwidth, but may be used with any of a 40, an 80, an 80+80, and a 160 MHz bandwidth, as described below.

In the process 1500, an AP sends a trigger frame 1502 to a plurality of stations, wherein the trigger frame 1502 indicates a first information for the immediately following UL OFDMA frame 1504, the first information comprising at least the following information:

An allocated resource structure, here N allocable resources units R(1) to R(N).

A mapping between stations and resource allocation units that is not 1-to-1, and thus allows more than one station within the plurality of stations to attempt to use a same RA resource for an UL MU transmission, at least for one or more RA resources, and A transmission length.

In the example of FIG. 15, the trigger frame 1502 includes a first Per User Info field 1522-1 that allocates the first and second resources units R(1) and R(2) to a first station STA1. After the first Per User Info field 1522-1, the trigger frame 1502 includes a second Per User Info field 1522-2 that allocates resources units including R(3) to a first RA opportunity, and a third Per User Info field 1522-3 that allocates resources units including R(N−1) to a second RA opportunity.

After the last of the Per User Info fields, the trigger frame 1502 includes a Padding field 1524 if necessary and an FCS field 1526.

As a response to the first frame 1502, the first station STA1 transmits a first UL OFDMA frame 1504*a* a SIFS after receiving the first frame 1502. The first UL OFDMA frame 1504*a* comprising a first preamble 1506*a* and first and second payloads 1508 and 1510. The first preamble 1506*a* uses the entirety of 20 MHz subchannel(s) which contains the resource units R(1) and R(2) allocated to the UL OFDMA transmission by the AP (which in the illustrated example is the entire 20 MHz bandwidth of the UL MU transmission, but which might be more than 20 MHz and/or less than the entire bandwidth in an UL MU transmission using 40 MHz or more of bandwidth). The first and second payloads 1508 and 1510 use only the bandwidth of the first and second resource R(1) and R(2), respectively, that were allocated to the first station STA1.

As a response to the first frame 1502, other stations within the plurality of stations that have UL frames buffered for the AP may send respective UL OFDMA frames using one of the resources R(3) to R(N) a SIFS after receiving the first frame 1502.

In FIG. 15, two of the other stations (the associated second station STA2 and the unassociated fifth station STA5) have buffered data for the UL transmission to the AP. The second station STA2 chooses to use a third resource R(3) that was allocated to an RA opportunity to send its buffered data or information about its buffered data, and the fifth station STA5 chooses to use a fourth resource R(N−1) that was allocated to an RA opportunity to send its buffered data or information about its buffered data.

The second station STA2, after successfully contending for the third resource R(3), transmits a second UL OFDMA frame 1504*b* including a second preamble 1506*b* and a third payload 1512. Successfully contending for the third resource R(3) may include having a value of an OFDMA BackOff (OBO) counter of the second station STA2 being zero, as described below. The second preamble 1506*b* uses the entirety of 20 MHz subchannel(s) which contain(s) the resource unit R(3) allocated to the UL OFDMA transmission by the AP. The third payload 1512 uses only the bandwidth of the third resource R(2).

The fifth station STA5, after successfully contending for the fourth resource R(N−1), transmits a third UL OFDMA frame 1504*c* including a third preamble 1506*c* and a fourth payload 1514. Successfully contending for the fourth resource R(N−1) may include having a value of an OFDMA BackOff (OBO) counter of the fifth station STA5 being zero, as described below. The third preamble 1506*c* uses the entirety of 20 MHz subchannel(s) which contain(s) the resource unit R(N−1) allocated to the UL OFDMA transmission by the AP. The fourth payload 1514 uses only the bandwidth of the fourth resource R(N−1).

The UL OFDMA frames 1504*a*, 1504*b*, and 1504*c*, along with any UL OFDMA frames sent by other stations in response to the first frame 1502, air-combine in the wireless channel to create the received UL OFDMA frames 1504. The received UL OFDMA frames 1504 includes a received preamble 1506*d* containing each of the first, second, and third preambles 1506*a*, 1506*b*, and 1506*c*. The received UL OFDMA frames 1504 includes a received payload comprised of the payloads 1508, 1510, 1512, and 1514 and any other payloads sent by other stations in response to the first frame 1502, when stations sending payloads choose respective different resources to send the respective payloads.

As a response to the receiving the received UL OFDMA frame 1504 from one or more of the stations, the AP sends back an acknowledgement frame 1516 a SIFS after receiving the received UL OFDMA frame 1504.

As can be seen in FIG. 15, stations responding to different Per User Info fields have different amounts of time to process the Per User Info before transmitting the response. The first station STA1 has a first available processing time $T_{UF1}$ for processing the first frame 1502 containing the first Per User Info field 1522-1 before preparing and transmitting the response. The second station STA2 has a second available processing time $T_{UF2}$ for processing the first frame 1502 containing the second Per User Info field 1522-2 before preparing and transmitting the response. The fifth station STA5 has a third available processing time $T_{UF3}$ for processing the first frame 1502 containing the third Per User Info field 1522-3 before preparing and transmitting the response.

The third available processing time $T_{UF3}$ is less than the second available processing time $T_{UF2}$ by the duration of the third Per User Info field 1522-3. The third available processing time $T_{UF3}$ is less than the first available processing time $T_{UF1}$ by the sum of the duration of the second Per User Info field 1522-2 and the duration of the third Per User Info field 1522-3.

In an embodiment, Per User Info fields allocating resources to RA opportunities in an UL MU OFDMA transmission are always assigned later in the trigger frame that triggers the UL MU OFDMA transmission than Per User Info fields allocating resources to particular stations. As a result, stations that might use an RA opportunity in an UL MU OFDMA transmission, which RA-using stations may not be known to the AP, have less processing time than any of the stations using explicit (non-RA) allocations. When the RA-using stations include stations not associated with the AP, the AP may not know the minimum amount of time the unassociated RA-using stations need to process the first frame 1502 containing a Per User Info field before preparing and transmitting the response.

During the process of associating with an HE AP, each HE STA transmits a HE MAC Capabilities information field which includes a Trigger Frame MAC Padding Duration subfield. The Trigger Frame MAC Padding Duration subfield indicates an amount of time MinTrigProcTime, in microseconds, that corresponds to a time needed for the HE STA to process a pertinent Per User Info field in a received Trigger frame and to prepare and transmit the response with SIFS. The MinTrigProcTime of an HE STA corresponds to an amount of time the HE STA needs to process a Trigger frame Per User Info field pertinent to the HE STA, that is, to process a Per User Info field that may allocate an RU the HE STA might use to respond to the Trigger frame.

The HE AP uses the MinTrigProcTime values indicated by the STAs to determine the length of the Padding field that follows the Per User Info fields in a Trigger frame. The MinTrigProcTime indicates a minimum time from the end of a Per User Info field pertinent to the station to the end of the PPDU including that Per User Info field. The HE AP selects a length for the Padding field to ensure that time from the end of a Per User Info field pertinent to the station to the end of the PPDU is larger than or equal to the MinTrigProcTime value specified by the station. The Padding field may be absent when it is not needed for all STAs that are to respond to the Trigger frame.

The Padding field, if present, extends the frame length to give the recipient STAs more time to prepare a response. In an embodiment, the start of the Padding subfield in a Trigger frame is identified by a User Info field that has a value of the AID field equal to 0xFFF, and the rest of the bits of the Padding field are all set to one.

For example, in FIG. 15, the Padding field 1524 in the Trigger frame 1502 may be extended if necessary to ensure that the first available processing time $T_{UF1}$ is at least as long as necessary to comply with the MinTrigProcTime value indicated by the first station STA1 when the first station STA1 associated with the AP. However, the AP does not know which station will respond to RA Per User Info fields 1522-2 and 1522-3, and therefore cannot determine by the same process used for first available processing time $T_{UF1}$ the necessary padding to produce an adequate second available processing times $T_{UF2}$ and an adequate third available processing times $T_{UF3}$.

Figure 16:
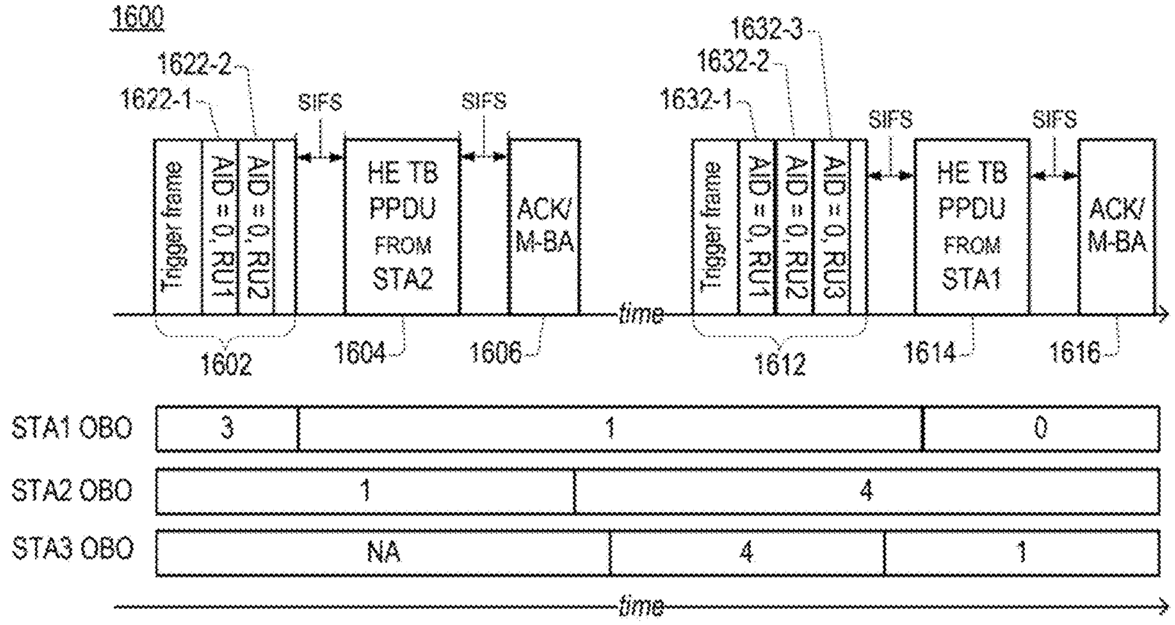
FIG. 16 illustrates backoff features of a Trigger-based UL MU RA process according to an embodiment.

FIG. 16 illustrates features of an UL OFDMA random access process according to an embodiment, and in particular with respect to UL OFDMA contention parameters.

An AP indicates, in a Beacon or Probe Response frame, the range of OFDMA Contention Windows (OCW) for HE STAs to initiate random access following the Trigger frame transmission. The AP indicates an initial value OCWmin for the OCW and an upper limit OCWmax of the OCW. The OCW, OCWmin, and OCWmax are all integers. An unassociated HE STA shall initialize the range of OFDMA contention window (OCW) upon reception of the corresponding information from the intended HE AP. If the HE STA has not received the corresponding information the AP it wishes to communicate with, it shall use the default value OCWmin=7 and OCWmax=31 to be used upon reception of a Trigger frame containing RU with an AID12 subfield equal to 0 or 2045. Each time an unassociated HE STA communicates with a different AP using random access it shall initiate its OFDMA random access backoff (OBO) based on the default values or based on the parameters from the corresponding information for that AP.

For an initial HE trigger-based (TB) PPDU transmission or following a successful HE TB PPDU transmission, an HE STA having information to transmit to the AP in an UL RA opportunity sets the value of OCW to the initial value OCWmin provided by the AP and initialize its OFDMA BackOff (OBO) counter to a random value in the range of 0 and OCWmin. The HA STA then performs the process 1600 in response to receiving a Trigger frame from the AP.

When the HE STA receives the Trigger frame and the OBO counter is smaller than the number of RUs respectively assigned by the Trigger frame to applicable Random Access (RA) opportunities, the HE STA decrements its OBO counter to zero. When the OBO counter is 0 or if the OBO counter decrements to 0, the HE STA may randomly select one of the RUs assigned to applicable RA opportunities as the RU to use in the HE STA's UL random access.

The HE STA then determines whether the selected RU is used to transmit the HE trigger-based (TB) PPDU transmission depending on the medium state, using both physical and virtual carrier sensing. When the medium of the selected RU is idle, the HE STA transmits an HE trigger-based PPDU using the selected RU. When the medium of the selected RU is not determined to be idle, the HE STA does not transmit the HE trigger-based PPDU in the selected RU. Instead, the HE STA leaves the OBO counter zero and repeats the process 1600 when the next Trigger frame including an RU assigned to an applicable RA opportunity is received.

When the HE STA successfully transmits an HE trigger-based PPDU in the selected RU, then the HE STA shall set its OCW to OCWmin.

When the HE STA receives the Trigger frame and the OBO counter is not zero and is not smaller than the number of RUs respectively assigned by the Trigger frame to applicable RA opportunities, the HE STA decrements its OBO counter by the number of RUs respectively assigned by the Trigger frame to applicable RA opportunities and repeats the process 1600 when the next Trigger frame including an RU assigned to an applicable RA opportunity is received.

Accordingly, in the illustrative example of FIG. 16, an AP transmits a first Trigger frame 1602. The first Trigger frame 1602 including a first Per User Info field 1622-1 allocating a first RU (RU1) to RA and a second Per User Info field 1622-2 allocating a second RU (RU2) to RA.

The first Trigger frame 1602 is received by first, second, and third STAs STA1, STA2, and STA3. At the time of receiving the first Trigger frame 1602, STA1 has information for UL RA transmission to the AP and has an OBO counter equal to 3, STA2 has information for UL RA transmission to the AP and has an OBO counter equal to 1, and STA3 does not have buffered information for UL RA transmission.

Because the number of RUs respectively assigned by the Trigger frame 1602 to applicable RA opportunities (i.e., to RA, here, two) is less than the value of the OBO counter of STA1, STA1 decrements the OBO counter by the number of RUs respectively assigned by the Trigger frame 1602 to applicable RA opportunities (two).

Because the OBO counter of STA2 is one (that is, less than two), STA2 selects one of the RUs assigned to an applicable RA opportunity and, after determining that the medium of the selected RU is idle, transmits an HE TB PPDU 1604 to the AP. STA2 then receives a first ACK/M-BA frame 1606 indicating that the HE TB PPDU 1604 was successfully received, and in response sets its OBO counter to OCWmin (here, 4).

After the first ACK/M-BA frame 1606, STA3 determines that it has buffered information for UL RA transmission to the AP and sets its OBO counter to OCWmin (here, 4).

Subsequently, the AP transmits a second Trigger frame 1612. The second Trigger frame 1612 including a third Per User Info field 1632-1 allocating RU1 to RA, a fourth Per User Info field 1632-2 allocating RU2 to RA, and a fifth Per User Info field 1632-3 allocating a third RU (RU3) to RA.

The second Trigger frame 1612 is then received by first, second, and third STAs STA1, STA2, and STA3. At the time of receiving the first Trigger frame 1612, STA1 has buffered information for UL RA transmission to the AP and has an OBO counter equal to 1, STA2 does not have buffered information for UL RA transmission to the AP and has an OBO counter equal to 4, and STA3 has buffered information for UL RA transmission to the AP and has an OBO counter equal to 4.

Because the number of RUs respectively assigned by the Trigger frame 1612 to applicable RA (three) is greater than the OBO counter of STA1, STA1 decrements its OBO counter to zero, selects one of the RUs assigned to applicable RA, and, after determining that the medium of the selected RU is idle, transmits an HE TB PPDU 1614 to the AP. STA1 then receives a second ACK/M-BA frame 1616 indicating that the HE TB PPDU 1614 was successfully received, and in response sets its OBO counter to OCWmin (here, 4) (not shown).

Because STA2 has no buffered information for UL RA transmission to the AP, STA2 does not alter its OBO counter.

Because the number of RUs respectively assigned by the Trigger frame 1612 to applicable RA (three) is less than the value of the OBO counter of STA3, STA3 decrements the OBO counter by the number of RUs respectively assigned by the Trigger frame 1612 to applicable Random Access (RA) opportunities (three).

Referring back to FIG. 15, the AP when determining the duration of the Padding field 1524 does not have a station associated with the second Per User Info field 1522-2, and therefore does not have a particular MinTrigProcTime value to use in determining whether the second available processing time $T_{UF2}$ provides enough time for the stations (such as STA2) that might use the RA opportunity allocated in the second Per User Info field 1522-2 to process the Trigger frame 1502 including the second Per User Info field 1522-2 to prepare and transmit the response within given IFS (e.g. SIFS). The HE AP ensures that the duration of the symbols that follow the symbol in the Trigger Frame 1502 that contains the last bit of the STA's User Info field is larger than or equal to the MinTrigProcTime specified by the STA. The embodiment of FIG. 15 uses the Padding field 1524 to ensure this, but embodiments are not limited thereto.

Also, some STAs not associated with AP may have not yet transmitted respective HE MAC Capabilities information fields including the Trigger Frame MAC Padding Durations indicating respective MinTrigProcTime.

In these cases, the AP may need a way to guarantee enough processing time of the received the Trigger frame for those STAs which randomly select one of RUs allocated for random access, even though the AP does not even know what stations might use the RA opportunity.

The present disclosure is directed to providing sufficient processing time to a STA which might randomly selects one of RUs assigned for random access in a Trigger frame.

In an embodiment, an AP determines an amount of padding bits in a Padding field in a Trigger frame by assuming that a station which may use a last RU assigned for RA (that is, an RU allocated to RA by a last Per User Info field of the Trigger frame) requires a longest MinTrigProcTime in order to have necessary additional processing time.

In an embodiment, the longest MinTrigProcTime is a longest MinTrigProcTime indicated by any STA associated with the AP.

In an embodiment, the longest MinTrigProcTime is a longest MinTrigProcTime of any STA associated with the AP that might make use of the last RU assigned for RA (which may, in illustrative embodiments, exclude stations having explicit allocations of RUs in the Trigger frame or exclude inactive stations).

In another embodiment, the longest MinTrigProcTime is a predetermined value corresponding to a longest supported MinTrigProc Time, for example, 16 microseconds.

Figure 17:
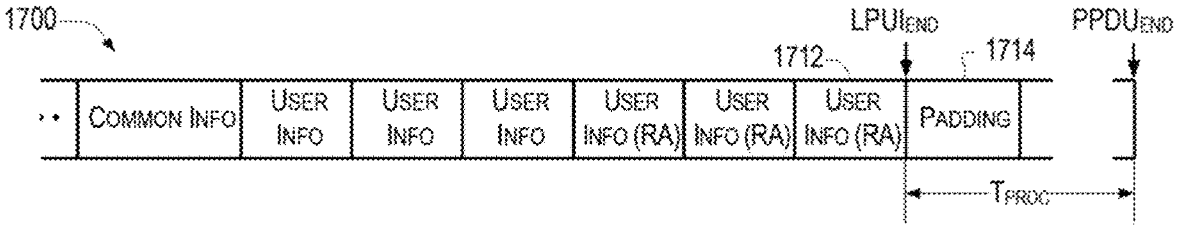
FIG. 17 illustrates a portion of a Trigger frame according to an embodiment.

FIG. 17 illustrates a Trigger frame 1700 according to an embodiment. The Trigger frame 1700 includes a last Per User Info field 1712 and a Padding field 1714. The last Per User Info field 1712 allocates one or more resources to RA. A processing time $T_{PROC}$ corresponds to an amount of time from a first time $LPUI_{END}$ of the end or last bit of a last symbol of the last Per User Info field 1712 to a second time $PPDU_{END}$ of the end of the last symbol of a PPDU including the Trigger frame 1700. The AP may determine the processing time $T_{PROC}$ by inserting zero or more bits into the Padding field 1714.

In an embodiment, when the last Per User Info field 1712 allocates resources to RA, the processing time $T_{PROC}$ is equal to the largest value of MinTrigProcTime among all the stations that might use the resources allocated to RA by the last Per User Info field 1712.

In an embodiment, when the last Per User Info field 1712 allocates resources to RA, the processing time $T_{PROC}$ is equal to the largest possible value of MinTrigProcTime supported by the AP. In an embodiment, the largest possible value of MinTrigProcTime is 16 microseconds.

Since the AP, using the added padding bits in the Padding field 1714, is able to guarantee enough time to process the received Per User Info fields of the Trigger frame, any STAs which randomly select one of RUs assigned for random access is allowed to transmit a HE trigger-based PPDUs in UL transmission in the randomly selected RU if the selected RU is idle as a result of both physical and virtual carrier sensing.

Using a largest value of MinTrigProcTime among all the stations that might use resources allocated to RA or a largest possible value of MinTrigProcTime for the processing time $T_{PROC}$ may result an in unnecessarily long Padding subfield in the Trigger frame because the AP is trying to cover the worst case. The worst case is when a low-capability STA (that is, a STA which require a longest supported processing time) selects the last RU assigned for random access in the Trigger frame as the RU to use for its response. If the STA which randomly selects the last RU assigned for random access requires less processing time rather than a given MinTrigProc Time, using a longer value for the processing time $T_{PROC}$ than required may be inefficient since it may delay the post-Trigger-frame frame exchanges.

In an embodiment, if the AP does not schedule any RU for random access in a Trigger frame, the AP applies the Trigger Frame MAC Padding field with duration corresponding to the longest value among all STAs that have requested extra MinTrigProcTime through Trigger Frame MAC Padding Duration capability. Otherwise, if the AP schedules one or more RUs for random access in a Trigger frame, the AP applies the Trigger Frame MAC Padding field according to a predetermined duration.

In one embodiment, if an AP does not schedule any RU for random access in a Trigger frame, the AP applies the Trigger Frame MAC Padding field with duration according to the longest value among all STAs that have requested extra MinTrigProcTime through that Trigger Frame MAC Padding Duration capability. Otherwise (if the AP schedules one or more RUs for random access in a Trigger frame), the AP applies the Trigger Frame MAC Padding field with 16 us.

Embodiments also relate to the behavior of a STA receiving a Trigger frame including an RU allocated for RA.

In an embodiment, when a STA receives a Trigger frame including a Per User info field that allocates an RU for random access, the STA compares a first value to a second value corresponding to a duration of the remaining symbols that follow a symbol in the Trigger Frame that contains the last bit of the Per User info field, wherein the first value is a required processing time for the STA to transmit, in response to the Trigger frame, a HE trigger-based (TB) PPDU within an SIFS interval of the end of the PPDU including the Trigger frame. In an embodiment, the first value is a MinTrigProcTime of the STA.

The STA may calculate a number of Per User Info fields that assign RUs for random access (M) once the STA recognizes a first Per User Info field that assigns an RU for random access (such as a first Pre User Info field having an AID of 0). The STA may calculate M using the remaining duration of the Trigger frame and the predetermined size of Per User Info fields that assign RUs for random access. The STA can then calculate the available number (N) of Per User Info fields that assign RUs for random access which have enough processing time available after their respective ends (N, N<M) using the STA's MinTrigProcTime, and then may select an RU to use out of the RUs allocated by the N Per User Info fields, the selected RU being used to transmit a response to the Trigger frame.

In an embodiment, when the STA selects an RU of the RUs allocated by the N Per User Info fields and the OBO initial counter is less than or equal to N, the STA's OBO counter decrements to 0.

In an embodiment, when the STA selects an RU of the RUs allocated by the first N Per User Info fields, the STA randomly selects the RU.

If the selected RU is idle as a result of both physical and virtual carrier sensing, the STA transmits its HE trigger-based PPDU. If the selected RU is considered busy as a result of either physical or virtual carrier sensing, then the HE STA shall not transmit its HE trigger-based PPDU in the selected RU and selects any one of the RUs that are assigned for random access in the subsequent Trigger frame.

In an embodiment, when an HE STA has an OBO counter with a value greater than N, the HE STA decrements its OBO counter by N as a new value. And the STA resumes with its OBO counter at the new value, comparing the new value with the number of RUs assigned for random access in the next Trigger frame.

For example, assuming a STA initializes its OBO counter to a random value "a" in the range of 0 and OCWmin. When the STA recognizes the User info field with AID12 set to 0, the STA can calculate the available number of RUs (e.g. 2) which have enough processing time. Then the STA randomly selects one of two first RUs.

If OBO initial counter is 2, the STA's OBO counter decrements to 0. The STA randomly selects one of the first two RUs (which provide enough time to process the received trigger frame) to send its HE trigger-based PPDU after a SIFS interval. If the selected RU is idle as a result of both physical and virtual carrier sensing, the STA transmits its HE trigger-based PPDU. If the selected RU is considered busy as a result of either physical or virtual carrier sensing, then the HE STA shall not transmit its HE trigger-based PPDU in the randomly selected RU and it will randomly select any one of the RUs that are assigned for RA in a subsequent Trigger frame.

For some cases, for example an HE STA's OBO counter is initially set to 5, then HE STA decrements its OBO counter by a value equal to N (e.g., 2). And the STA is allowed to resume with its OBO counter at the new value (e.g., 3) in response to the next Trigger frame with RUs assigned for random access. However in the same situation, if the STA were to not consider the number of RUs for random access (e.g. 2) for which Per User Info fields provide enough processing time, OBO counter would be decreased by a larger number (e.g., 4, which is greater than 2), such as the number of assigned RU for random access, because it does not consider its MinTrigProcTime. Since OBO counter value is more decreased, it is able to get more chance to randomly select one of RU assigned for random access in the subsequent Trigger frame, which might be unfair to other stations.

In an embodiment, when receiving a Trigger frame, for a User info field that is assigned for random access in the Trigger frame, a STA compares a first value to a second value corresponding to a duration of the remaining symbols that follow a symbol in the Trigger Frame that contains the last bit of the User Info field, wherein the first value is a required processing time of the received Trigger frame needed to transmit a HE trigger-based PPDU within an SIFS interval.

In an embodiment, the first value could be MinTrigProcTime of the STA.

Assuming the number of RU assigned for random access is M, once the STA recognizes a first User info field with AID12 set to 0, the STA can calculate the number (N) of a first group of RUs (N≤M) that have enough processing time when the STA randomly selects one of N RUs. This is because the STA's own MinTrigProcTime and the size of an RA User info field in the received Trigger frame are predetermined.

In an embodiment, when N is less than the OBO initial counter and the OBO initial counter is less than M, the STA's OBO counter is decremented to 0. The STA does not transmit its HE trigger-based PPDU and will randomly selects any of the RUs assigned for random access in a subsequent Trigger frame for transmitting its HE TB PPDU.

In an embodiment, when the first value is less than the second value, the STA's OBO counter is decreased by one. When OBO counter reaches down to 0, the STA randomly selects one of RUs having respective second values corresponding to RUs with enough time remaining after their respective User Info fields to process the received trigger frame. The STA transmits its HE trigger-based PPDU if the selected RU is idle as determined be both physical and virtual carrier sensing. If the selected RU is considered busy as a result of either physical or virtual carrier sensing, then the HE STA shall not transmit its HE trigger-based PPDU in the randomly selected RU and will randomly select any one of the RUs that are assigned for random access in a subsequent Trigger frame for transmission of its HE TB PPDU.

In an embodiment, when the first value is greater than the second value, the STA's OBO counter is decreased by one. When the STA's OBO counter reaches down to 0, the STA does not transmit its HE trigger-based PPDU and it randomly selects any of the RUs assigned for random access in a subsequent Trigger frame. When OBO counter reaches down to nonzero in the current trigger frame, it resumes with its OBO countdown having the decremented value in a next Trigger frame with RUs assigned for random access.

Figure 18:
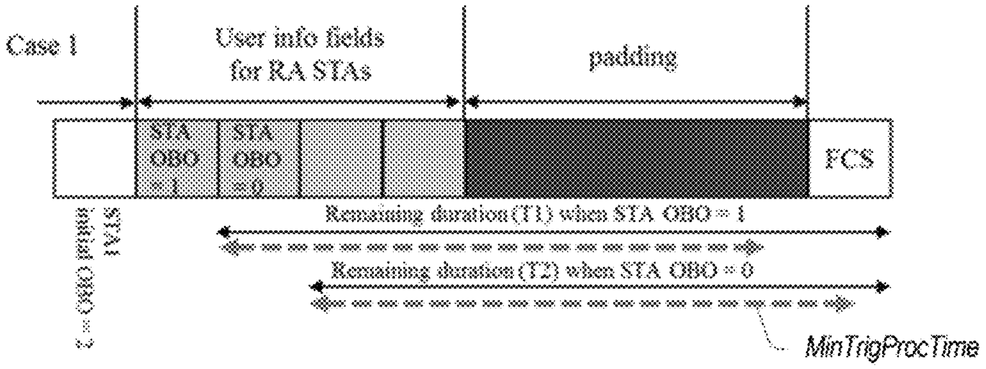
FIG. 18 illustrates an OFDMA Back Off (OBO) counter management process according to an embodiment.

FIG. 18 illustrates an OFDMA Back Off (OBO) Counter management process according to an embodiment. In this illustrative case, Case 1, the STA initializes its OBO counter to a random value of 2 (which is less than the number of RUs assigned for random access, 4) in the range of 0 and OCWmin. The STA compares its own MinTrigProcTime (indicated by the gray dashed arrow) with the remaining duration (e.g. T1, T2) to make sure that it can process the received trigger frame for the first two RUs assigned for random access. Since the MinTrigProcTime≤T1 and MinTrigProcTime≤T2, its OBO counter is decreased by one for each RU. When OBO counter reaches down to 0, the STA randomly selects one of RUs such as one of the first RU allocated for random access by the first Per User Info field (i.e. the first User Info field) and the second RU allocated for random access by the second Per User Info field (i.e. the first User Info field) assigned in the Trigger frame. The STA transmits its HE trigger-based PPDU if the selected RU is idle as determined by physical and virtual carrier sensing.

Figure 19:
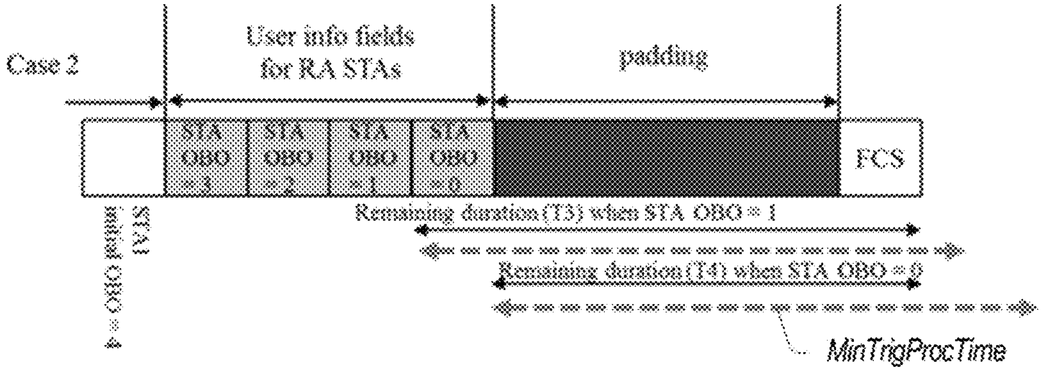
FIG. 19 illustrates an OBO counter management process according to an embodiment.

FIG. 19 illustrates an OBO Counter management process according to an embodiment. In this illustrative case, Case 2, the STA initializes its OBO counter to a random value of 4 in the range of 0 and OCWmin. In addition to the actions performed in Case 1 of FIG. 18, on the third and fourth Per User Info fields including RUs allocated for random access, the STA compares its own MinTrigProcTime with the remaining duration (T3, T4) to make sure that it can process the received trigger frame. Even though the MinTrigProcTime is greater than T3 and MinTrigProcTime is greater than T4, the STA's OBO counter is decreased by one for each Per User Info fields including RUs allocated for random access. Because T3 and T4 where less than MinTrigProcTime, when the OBO counter reaches down to 0, the STA does not transmit its HE trigger-based PPDU and will instead randomly select any of the RUs assigned for random access in a subsequent Trigger frame. When OBO counter reaches down to nonzero in the current trigger frame, it resumes with its OBO countdown at the decremented value in the next Trigger frame with RUs assigned for random access.

In an embodiment, an AP transmits a HE MAC Capabilities information field including a Trigger Frame MAC Padding Duration with a first value in a broadcast frame such as Beacon frame or Probe response frame.

In an embodiment, the first value indicates the additional amount of time secured by AP for a random access (RA) STA to process the received Trigger frame.

In an embodiment, the first value indicates a MinTrigProcTime in microseconds.

In an embodiment, the first value corresponds to one of 0, 8, and 16 microseconds.

Figure 20:
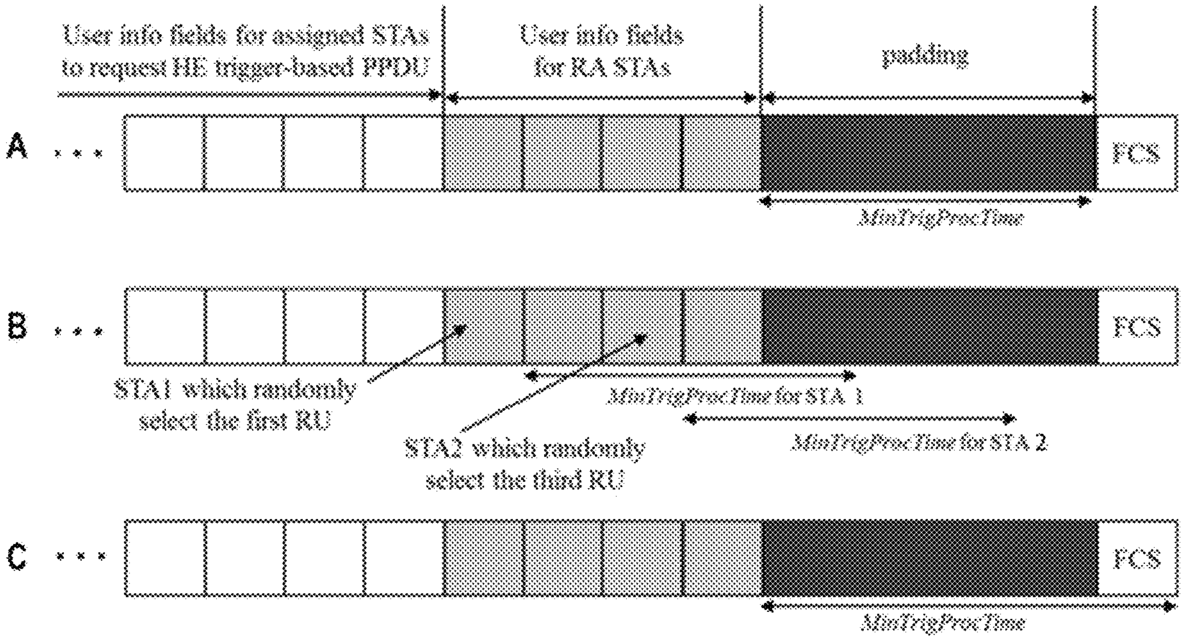
FIG. 20 illustrates illustrative examples of an indication of an amount of time, according to embodiments.

In an embodiment, the first value corresponds to an additional amount of time after a symbol that contains the last bit of the RA STA's User Info field in the Trigger Frame, as shown in example B of FIG. 20 as the two MinTrigProcTime durations.

In an embodiment, the first value corresponds to a duration of a padding field in the Trigger frame, as shown in example A of FIG. 20 as the MinTrigProcTime duration.

In an embodiment, the first value corresponds to the remaining duration of the Trigger frame after a symbol that contains the last bit of the last STA's User Info field which assigns an RU for random access in the Trigger Frame, as shown in example C of FIG. 20 as the MinTrigProcTime duration.

In an embodiment, when an AP does not schedule any RU for random access in a Trigger frame, the AP applies the Trigger Frame MAC Padding field with duration corresponding to the longest value among all STAs that have requested extra MinTrigProcTime through Trigger Frame MAC Padding Duration capability. Otherwise (if the AP schedules one or more RUs for random access in a Trigger frame), the HE AP applies the Trigger Frame MAC Padding field with duration corresponding to the first value that the AP broadcasted prior to the transmission of the Trigger frame.

In an embodiment, the first value is broadcasted in Beacon/Probe response frame using the Trigger Frame MAC Padding field.

Figure 21:
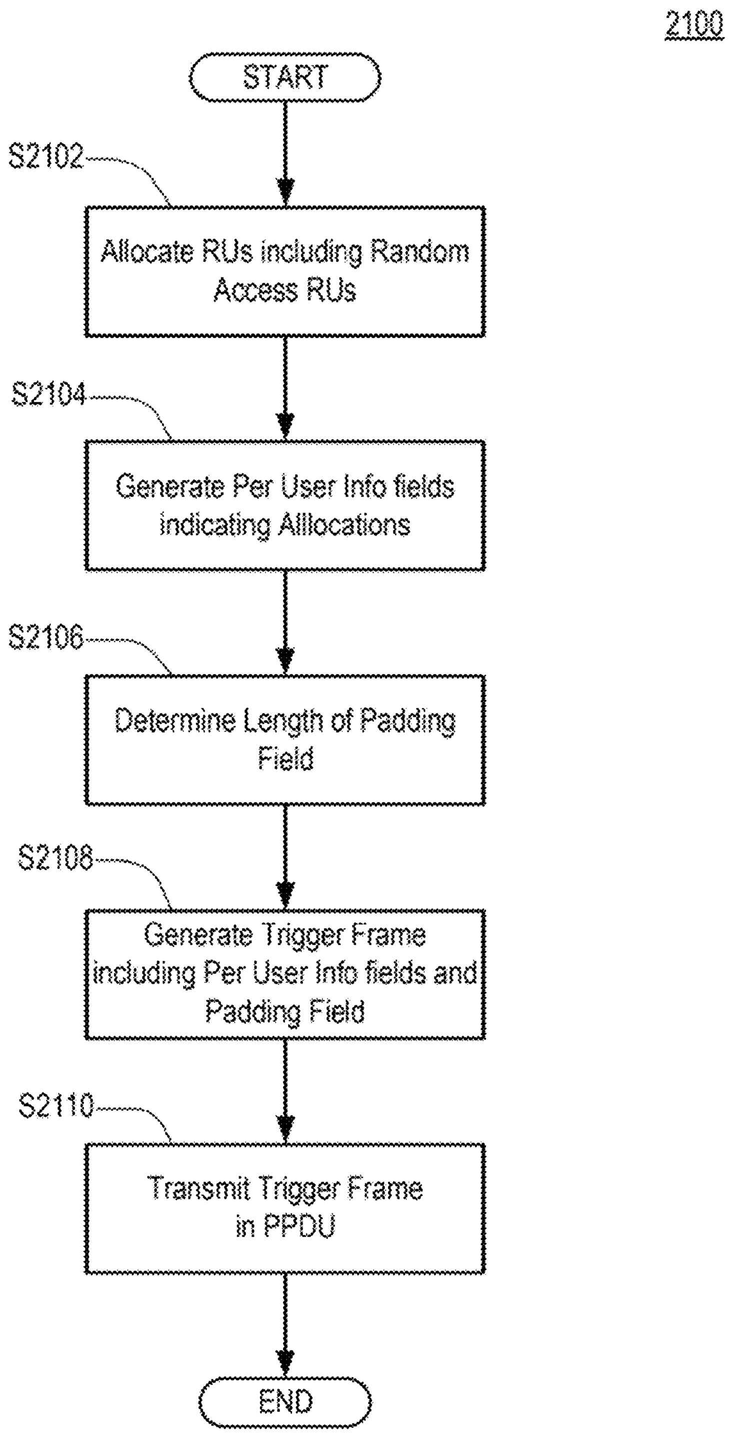
FIG. 21 illustrates a process of initiating an Up-Link Trigger Based Multi-User communication.

FIG. 21 illustrates a process 2100 of initiating an Up-Link (UL) Trigger Based (TB) Multi-User (MU) communication. The process may be performed by a wireless device such as the AP 102 of FIG. 1. In an embodiment, the UL TB MU communication is an Orthogonal Frequency Division Multiple Access (OFDMA) UL TB MU communication.

At S2102, the process 2100 allocates a plurality of Resource Units (RUs) of the UL TB MU communication. The allocated RUs include one or more RUs allocated to Random Access (RA RUs). The allocated RUs may also include zero or more RUs allocated to specific stations.

At S2104, the process 2100 produces a plurality of Per User info fields respectively indicating the allocations of RUs, including producing one or more RA Per User info fields respectively indicating the one or more allocations of resources for RA communication.

At S2106, the process 2100 determines a padding length and, if the padding length is greater than zero, produces a padding field having the padding length. The padding length is selected to ensure that a minimum amount of time is available for processing the trigger frame by stations receiving the trigger frame that may use the RA RUs allocated by an RA Per User info field of the one or more RA Per User info fields to perform the UL TB MU communication. In an embodiment, the RA Per User info field is a last transmitted RA Per User info field of the one or more RA Per User info fields.

At S2108, the process 2100 produces a trigger frame to initiate the UL TB MU communication. The trigger frame includes the plurality of Per User info fields and the padding field.

At S2110, the process 2100 transmits, in a Physical layer Protocol Data Unit (PPDU), the trigger frame. The padding field is transmitted after the plurality of Per User info fields.

In an embodiment, the one or more RA Per User info fields are transmitted as the last of the plurality of Per User Info fields.

In an embodiment, the padding length is selected to ensure that an amount of a duration of the symbols that follow the symbol in the Trigger frame that contains the last bit of the STA's Per User info field and the end of the PPDU including the Trigger frame is greater than to equal to a largest processing time of processing times received from stations associated with the wireless device. A processing time received from a station associated with the wireless device may be a MinTrigProcTime.

In an embodiment, the padding length is selected to ensure that an amount of time between the end of a last symbol of the last RA Per User info field and the end of the PPDU is greater than to equal to a largest processing time of processing times received from stations associated with the wireless device. A processing time received from a station associated with the wireless device may be a MinTrigProcTime.

In an embodiment, the padding length is selected to ensure that an amount of time between the end of a last symbol of the last RA Per User info field and the end of the PPDU is greater than to equal to a predetermined value as MinTrigProcTime. The predetermined value may be 16 microseconds.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

While this invention has been described in connection with what is presently considered to be practical embodiments, embodiments are not limited to the disclosed embodiments, but, on the contrary, may include various modifications and equivalent arrangements included within the spirit and scope of the appended claims. Further, two or more embodiments may be combined.

What is claimed is:

1. A wireless device comprising:

a processing device; and a memory unit, coupled to the processing device, storing instructions that when executed by the processing device cause the wireless device to:

allocate a plurality of resources for an uplink trigger-based transmission, including allocating one or more resources for random-access communications;

generate a plurality of information fields indicating the allocations of the plurality of resources, including one or more random-access information fields indicating the one or more allocations of resources for the random-access communications;

determine a padding length according to a minimum processing time for a station to process a random-access information field of the one or more random-access information fields, wherein the padding length ensures that at least the minimum processing time elapses between an end of the random-access information field and an end of a physical layer protocol data unit (PPDU) to be transmitted;

generate a padding field having on the padding length;

generate a trigger frame including the plurality of information fields and the padding field, the trigger frame to initiate the uplink trigger-based transmission; and transmit the PPDU including the trigger frame, wherein the padding field is transmitted after the plurality of information fields.

2. The wireless device of claim 1, wherein the one or more random-access information fields are transmitted as the last of the plurality of information fields in the trigger frame.

3. The wireless device of claim 1, wherein the minimum processing time is a largest processing time among processing times received from stations associated with the wireless device.

4. The wireless device of claim 1, wherein the minimum processing time is a predetermined value.

5. The wireless device of claim 4, wherein the predetermined value is 16 microseconds.

6. The wireless device of claim 1, wherein the random-access information field is a last-transmitted random-access information field of the one or more random-access information fields.

7. The wireless device of claim 1, wherein the instructions further cause the wireless device to transmit, in a broadcast frame, a value indicating the minimum processing time for the random-access communications prior to transmitting the PPDU including the trigger frame.

8. The wireless device of claim 1, wherein the uplink trigger-based transmission is an Orthogonal Frequency Division Multiple Access (OFDMA) transmission, and the plurality of resources comprises a plurality of resource units.

9. A method performed by a wireless device, the method comprising:

allocating a plurality of resources for an uplink trigger-based transmission, including allocating one or more resources for random-access communications;

generating a plurality of information fields indicating the allocations of the plurality of resources, including one or more random-access information fields indicating the one or more allocations of resources for the random-access communications;

determining a padding length based on a minimum processing time for a station to process a random-access information field of the one or more random-access information fields, wherein the padding length ensures that at least the minimum processing time elapses between an end of the random-access information field and an end of a Physical layer Protocol Data Unit (PPDU) to be transmitted;

generating a padding field having the padding length;

generating a trigger frame including the plurality of information fields and the padding field, the trigger frame to initiate the uplink trigger-based transmission; and transmitting the PPDU including the trigger frame, wherein the padding field is transmitted after the plurality of information fields.

10. The method of claim 9, wherein the one or more random-access information fields are transmitted as the last of the plurality of information fields in the trigger frame.

11. The method of claim 9, wherein the minimum processing time is a largest processing time among processing times received from stations associated with the wireless device.

12. The method of claim 9, wherein the minimum processing time is a predetermined value.

13. The method of claim 9, wherein the random-access information field is a last-transmitted random-access information field of the one or more random-access information fields.

14. The method of claim 9, further comprising transmitting, in a broadcast frame, a value indicating the minimum processing time for the random-access communications prior to transmitting the PPDU including the trigger frame.

15. A non-transitory computer-readable medium storing instructions that, when executed by a processing device of a wireless device, cause the wireless device to perform operations comprising:

allocating a plurality of resources for an uplink trigger-based transmission, including allocating one or more resources for random-access communications;

generating a plurality of information fields indicating the allocations of the plurality of resources, including one or more random-access information fields indicating the one or more allocations of resources for the random-access communications;

determining a padding length based on a minimum processing time for a station to process a random-access information field of the one or more random-access information fields, wherein the padding length ensures that at least the minimum processing time elapses between an end of the random-access information field and an end of a Physical layer Protocol Data Unit (PPDU) to be transmitted;

generating a padding field having the padding length;

generating a trigger frame including the plurality of information fields and the padding field, the trigger frame to initiate the uplink trigger-based transmission; and transmitting the PPDU including the trigger frame, wherein the padding field is transmitted after the plurality of information fields.

16. The non-transitory computer-readable medium of claim 15, wherein the one or more random-access information fields are transmitted as the last of the plurality of information fields in the trigger frame.

17. The non-transitory computer-readable medium of claim 15, wherein the minimum processing time is a largest processing time among processing times received from stations associated with the wireless device.

18. The non-transitory computer-readable medium of claim 15, wherein the minimum processing time is a predetermined value.

19. The non-transitory computer-readable medium of claim 15, wherein the random-access information field is a last-transmitted random-access information field of the one or more random-access information fields.

20. The non-transitory computer-readable medium of claim 15, wherein the operations further comprise transmitting, in a broadcast frame, a value indicating the minimum processing time for the random-access communications prior to transmitting the PPDU including the trigger frame.

* * * * *